United States Patent
Paithane et al.

(10) Patent No.: US 10,417,031 B2
(45) Date of Patent: Sep. 17, 2019

(54) SELECTIVE VIRTUALIZATION FOR SECURITY THREAT DETECTION

(71) Applicant: FireEye, Inc., Milpitas, CA (US)

(72) Inventors: Sushant Paithane, Sunnyvale, CA (US); Michael Vincent, Sunnyvale, CA (US)

(73) Assignee: FireEye, Inc., Milpitas, CA (US)

( * ) Notice: Subject to any disclaimer, the term of this patent is extended or adjusted under 35 U.S.C. 154(b) by 137 days.

(21) Appl. No.: 15/081,775

(22) Filed: Mar. 25, 2016

(65) Prior Publication Data

US 2016/0335110 A1    Nov. 17, 2016

Related U.S. Application Data

(60) Provisional application No. 62/140,963, filed on Mar. 31, 2015.

(51) Int. Cl.
   *G06F 9/455*    (2018.01)
   *G06F 21/53*    (2013.01)
   *H04L 29/06*    (2006.01)

(52) U.S. Cl.
   CPC .......... *G06F 9/45558* (2013.01); *G06F 21/53* (2013.01); *H04L 63/145* (2013.01); *G06F 2009/45562* (2013.01); *G06F 2009/45587* (2013.01); *G06F 2009/45591* (2013.01); *G06F 2221/033* (2013.01)

(58) Field of Classification Search
   CPC .................................................. G06F 9/45533
   USPC .............................................................. 718/1
   See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,319,776 A | 6/1994 | Hile et al. | |
| 5,440,723 A | 8/1995 | Arnold et al. | |
| 5,490,249 A | 2/1996 | Miller | |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Venezia, Paul , "NetDetector Captures Intrusions", InfoWorld Issue 27, ("Venezia"), (Jul. 14, 2003).

(Continued)

*Primary Examiner* — Mehran Kamran
(74) *Attorney, Agent, or Firm* — Rutan & Tucker, LLP

(57) ABSTRACT

Selective virtualization of resources is provided, where the resources may be intercepted and services or the resources may be intercepted and redirected. Virtualization logic monitors for a first plurality of requests that are initiated during processing of an object within the virtual machine. Each of the first plurality of requests, such as system calls for example, is associated with an activity to be performed in connection with one or more resources. The virtualization logic selectively virtualizes resources associated with a second plurality of requests that are initiated during the processing of the object within the virtual machine, where the second plurality of requests is lesser in number than the first plurality of requests.

48 Claims, 11 Drawing Sheets

(56) References Cited

U.S. PATENT DOCUMENTS

| | | |
|---|---|---|
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivehenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,637 B1 * | 6/2009 | Agbabian ............... H04L 63/20 709/223 |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 * | 6/2012 | Wu ....................... G06F 21/554 703/23 |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |

(56) References Cited

U.S. PATENT DOCUMENTS

| | | | |
|---|---|---|---|
| 8,510,827 | B1 | 8/2013 | Leake et al. |
| 8,510,828 | B1 | 8/2013 | Guo et al. |
| 8,510,842 | B2 | 8/2013 | Amit et al. |
| 8,516,478 | B1 | 8/2013 | Edwards et al. |
| 8,516,590 | B1 | 8/2013 | Ranadive et al. |
| 8,516,593 | B2 | 8/2013 | Aziz |
| 8,522,348 | B2 | 8/2013 | Chen et al. |
| 8,528,086 | B1 | 9/2013 | Aziz |
| 8,533,824 | B2 | 9/2013 | Hutton et al. |
| 8,539,582 | B1 | 9/2013 | Aziz et al. |
| 8,549,638 | B2 | 10/2013 | Aziz |
| 8,555,391 | B1 | 10/2013 | Demir et al. |
| 8,561,177 | B1 | 10/2013 | Aziz et al. |
| 8,566,476 | B2 | 10/2013 | Shiffer et al. |
| 8,566,946 | B1 * | 10/2013 | Aziz ................ G06F 21/554 726/15 |
| 8,584,094 | B2 | 11/2013 | Dadhia et al. |
| 8,584,234 | B1 | 11/2013 | Sobel et al. |
| 8,584,239 | B2 * | 11/2013 | Aziz ................ G06F 21/554 713/182 |
| 8,595,834 | B2 | 11/2013 | Xie et al. |
| 8,627,476 | B1 | 1/2014 | Satish et al. |
| 8,635,696 | B1 | 1/2014 | Aziz |
| 8,682,054 | B2 | 3/2014 | Xue et al. |
| 8,682,812 | B1 | 3/2014 | Ranjan |
| 8,689,333 | B2 | 4/2014 | Aziz |
| 8,695,096 | B1 | 4/2014 | Zhang |
| 8,713,631 | B1 | 4/2014 | Pavlyushchik |
| 8,713,681 | B2 | 4/2014 | Silberman et al. |
| 8,726,392 | B1 | 5/2014 | McCorkendale et al. |
| 8,739,280 | B2 | 5/2014 | Chess et al. |
| 8,776,229 | B1 | 7/2014 | Aziz |
| 8,782,792 | B1 | 7/2014 | Bodke |
| 8,789,172 | B2 | 7/2014 | Stolfo et al. |
| 8,789,178 | B2 | 7/2014 | Kejriwal et al. |
| 8,793,278 | B2 | 7/2014 | Frazier et al. |
| 8,793,787 | B2 | 7/2014 | Ismael et al. |
| 8,805,947 | B1 | 8/2014 | Kuzkin et al. |
| 8,806,647 | B1 | 8/2014 | Daswani et al. |
| 8,832,829 | B2 | 9/2014 | Manni et al. |
| 8,839,245 | B1 * | 9/2014 | Khajuria ........... G06F 17/30233 718/1 |
| 8,850,570 | B1 | 9/2014 | Ramzan |
| 8,850,571 | B2 | 9/2014 | Staniford et al. |
| 8,881,234 | B2 | 11/2014 | Narasimhan et al. |
| 8,881,271 | B2 | 11/2014 | Butler, II |
| 8,881,282 | B1 | 11/2014 | Aziz et al. |
| 8,898,788 | B1 | 11/2014 | Aziz et al. |
| 8,935,779 | B2 | 1/2015 | Manni et al. |
| 8,949,257 | B2 | 2/2015 | Shiffer et al. |
| 8,984,638 | B1 | 3/2015 | Aziz et al. |
| 8,990,939 | B2 | 3/2015 | Staniford et al. |
| 8,990,944 | B1 * | 3/2015 | Singh ................ G06F 21/56 726/24 |
| 8,997,219 | B2 | 3/2015 | Staniford et al. |
| 9,009,822 | B1 | 4/2015 | Ismael et al. |
| 9,009,823 | B1 | 4/2015 | Ismael et al. |
| 9,027,135 | B1 | 5/2015 | Aziz |
| 9,071,638 | B1 | 6/2015 | Aziz et al. |
| 9,104,867 | B1 * | 8/2015 | Thioux ................ G06F 21/56 |
| 9,106,630 | B2 | 8/2015 | Frazier et al. |
| 9,106,694 | B2 | 8/2015 | Aziz et al. |
| 9,117,079 | B1 * | 8/2015 | Huang ................ G06F 21/566 |
| 9,118,715 | B2 | 8/2015 | Staniford et al. |
| 9,159,035 | B1 | 10/2015 | Ismael et al. |
| 9,171,160 | B2 | 10/2015 | Vincent et al. |
| 9,176,843 | B1 | 11/2015 | Ismael et al. |
| 9,189,627 | B1 | 11/2015 | Islam |
| 9,195,829 | B1 | 11/2015 | Goradia et al. |
| 9,197,664 | B1 | 11/2015 | Aziz et al. |
| 9,223,972 | B1 * | 12/2015 | Vincent ................ G06F 21/566 |
| 9,225,740 | B1 | 12/2015 | Ismael et al. |
| 9,241,010 | B1 | 1/2016 | Bennett et al. |
| 9,251,343 | B1 | 2/2016 | Vincent et al. |
| 9,262,635 | B2 | 2/2016 | Paithane et al. |
| 9,268,936 | B2 | 2/2016 | Butler |
| 9,275,229 | B2 | 3/2016 | LeMasters |
| 9,282,109 | B1 | 3/2016 | Aziz et al. |
| 9,292,686 | B2 | 3/2016 | Ismael et al. |
| 9,294,501 | B2 | 3/2016 | Mesdaq et al. |
| 9,300,686 | B2 | 3/2016 | Pidathala et al. |
| 9,306,960 | B1 | 4/2016 | Aziz |
| 9,306,974 | B1 | 4/2016 | Aziz et al. |
| 9,311,479 | B1 | 4/2016 | Manni et al. |
| 9,355,247 | B1 | 5/2016 | Thioux et al. |
| 9,356,944 | B1 | 5/2016 | Aziz |
| 9,363,280 | B1 | 6/2016 | Rivlin et al. |
| 9,367,681 | B1 | 6/2016 | Ismael et al. |
| 9,398,028 | B1 | 7/2016 | Karandikar et al. |
| 9,413,774 | B1 * | 8/2016 | Liu ................ H04L 63/1416 |
| 9,413,781 | B2 | 8/2016 | Cunningham et al. |
| 9,426,071 | B1 | 8/2016 | Caldejon et al. |
| 9,430,646 | B1 | 8/2016 | Mushtaq et al. |
| 9,432,389 | B1 | 8/2016 | Khalid et al. |
| 9,438,613 | B1 * | 9/2016 | Paithane ............ H04L 63/1425 |
| 9,438,622 | B1 | 9/2016 | Staniford et al. |
| 9,438,623 | B1 | 9/2016 | Thioux et al. |
| 9,459,901 | B2 | 10/2016 | Jung et al. |
| 9,467,460 | B1 | 10/2016 | Otvagin et al. |
| 9,483,644 | B1 * | 11/2016 | Paithane ............ G06F 17/30144 |
| 9,489,516 | B1 * | 11/2016 | Lu ................ G06F 21/566 |
| 9,495,180 | B2 * | 11/2016 | Ismael ................ G06F 9/455 |
| 9,497,213 | B2 | 11/2016 | Thompson et al. |
| 9,507,935 | B2 | 11/2016 | Ismael et al. |
| 9,516,057 | B2 | 12/2016 | Aziz |
| 9,519,782 | B2 | 12/2016 | Aziz et al. |
| 9,536,091 | B2 | 1/2017 | Paithane et al. |
| 9,537,972 | B1 | 1/2017 | Edwards et al. |
| 9,560,059 | B1 | 1/2017 | Islam |
| 9,565,202 | B1 | 2/2017 | Kindlund et al. |
| 9,591,015 | B1 | 3/2017 | Amin et al. |
| 9,591,020 | B1 | 3/2017 | Aziz |
| 9,594,904 | B1 | 3/2017 | Jain et al. |
| 9,594,905 | B1 | 3/2017 | Ismael et al. |
| 9,594,912 | B1 | 3/2017 | Thioux et al. |
| 9,609,007 | B1 | 3/2017 | Rivlin et al. |
| 9,626,509 | B1 | 4/2017 | Khalid et al. |
| 9,628,498 | B1 | 4/2017 | Aziz et al. |
| 9,628,507 | B2 | 4/2017 | Haq et al. |
| 9,633,134 | B2 | 4/2017 | Ross |
| 9,635,039 | B1 | 4/2017 | Islam et al. |
| 9,641,546 | B1 | 5/2017 | Manni et al. |
| 9,654,485 | B1 | 5/2017 | Neumann |
| 9,661,009 | B1 | 5/2017 | Karandikar et al. |
| 9,661,018 | B1 | 5/2017 | Aziz |
| 9,674,298 | B1 | 6/2017 | Edwards et al. |
| 9,680,862 | B2 | 6/2017 | Ismael et al. |
| 9,690,606 | B1 | 6/2017 | Ha et al. |
| 9,690,933 | B1 | 6/2017 | Singh et al. |
| 9,690,935 | B2 | 6/2017 | Shiffer et al. |
| 9,690,936 | B1 | 6/2017 | Malik et al. |
| 9,736,179 | B2 | 8/2017 | Ismael |
| 9,740,857 | B2 | 8/2017 | Ismael et al. |
| 9,747,446 | B1 | 8/2017 | Pidathala et al. |
| 9,756,074 | B2 | 9/2017 | Aziz et al. |
| 9,773,112 | B1 | 9/2017 | Rathor et al. |
| 9,781,144 | B1 | 10/2017 | Otvagin et al. |
| 9,787,700 | B1 | 10/2017 | Amin et al. |
| 9,787,706 | B1 | 10/2017 | Otvagin et al. |
| 9,792,196 | B1 | 10/2017 | Ismael et al. |
| 9,824,209 | B1 | 11/2017 | Ismael et al. |
| 9,824,211 | B2 | 11/2017 | Wilson |
| 9,824,216 | B1 | 11/2017 | Khalid et al. |
| 9,825,976 | B1 | 11/2017 | Gomez et al. |
| 9,825,989 | B1 | 11/2017 | Mehra et al. |
| 9,838,408 | B1 | 12/2017 | Karandikar et al. |
| 9,838,411 | B1 | 12/2017 | Aziz |
| 9,838,416 | B1 | 12/2017 | Aziz |
| 9,838,417 | B1 | 12/2017 | Khalid et al. |
| 9,846,776 | B1 | 12/2017 | Paithane et al. |
| 9,876,701 | B1 | 1/2018 | Caldejon et al. |
| 9,888,016 | B1 | 2/2018 | Amin et al. |
| 9,888,019 | B1 | 2/2018 | Pidathala et al. |
| 9,910,988 | B1 | 3/2018 | Vincent et al. |

(56) References Cited

U.S. PATENT DOCUMENTS

| | | |
|---|---|---|
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0273856 A1* | 12/2005 | Huddleston ............ G06F 21/53 726/22 |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |

(56) References Cited

U.S. PATENT DOCUMENTS

| | | |
|---|---|---|
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1* | 12/2008 | Jiang .................... G06F 21/566 726/24 |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1* | 2/2009 | Budko .................... G06F 21/53 726/24 |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1* | 9/2009 | Todd .................... G06F 21/53 726/23 |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0185436 A1* | 7/2011 | Koulinitch .......... G06F 21/6218 726/28 |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0271342 A1* | 11/2011 | Chung ................. G06F 21/554 726/23 |
| 2011/0289582 A1 | 11/2011 | Kejriwal et al. |
| 2011/0302587 A1 | 12/2011 | Nishikawa et al. |

(56) References Cited

U.S. PATENT DOCUMENTS

| | | |
|---|---|---|
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0144489 A1* | 6/2012 | Jarrett .................. G06F 21/566 726/24 |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255010 A1* | 10/2012 | Sallam .................. G06F 21/572 726/24 |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1* | 1/2013 | Gribble .................. G06F 21/53 726/24 |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0246685 A1* | 9/2013 | Bhargava ............... G06F 21/00 711/6 |
| 2013/0247186 A1 | 9/2013 | LeMasters |
| 2013/0263260 A1 | 10/2013 | Mahaffey et al. |
| 2013/0263268 A1* | 10/2013 | Kim .................. H04L 63/1458 726/23 |
| 2013/0291109 A1 | 10/2013 | Staniford et al. |
| 2013/0298243 A1 | 11/2013 | Kumar et al. |
| 2013/0312097 A1* | 11/2013 | Turnbull .................. G06F 21/55 726/24 |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0279435 A1* | 9/2014 | Holman .................. G06Q 20/12 705/39 |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0304819 A1* | 10/2014 | Ignatchenko ......... G06F 21/568 726/24 |
| 2014/0328204 A1 | 11/2014 | Klotsche et al. |
| 2014/0337836 A1* | 11/2014 | Ismael .................... G06F 9/455 718/1 |
| 2014/0344807 A1* | 11/2014 | Bursell ............... G06F 9/45558 718/1 |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1* | 12/2014 | Paithane ............... G06F 21/567 726/23 |
| 2015/0007312 A1 | 1/2015 | Pidathala et al. |
| 2015/0013008 A1* | 1/2015 | Lukacs .................... G06F 21/53 726/24 |
| 2015/0067862 A1* | 3/2015 | Yu ......................... H04L 63/145 726/24 |
| 2015/0096022 A1* | 4/2015 | Vincent ................. G06F 21/566 726/23 |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0178113 A1* | 6/2015 | Dake ................... G06F 9/45558 718/1 |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0304716 A1* | 10/2015 | Sanchez-Leighton ....................... G06F 21/53 725/31 |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0173509 A1* | 6/2016 | Ray ..................... H04L 63/1425 726/23 |
| 2016/0191547 A1 | 6/2016 | Zafar et al. |
| 2016/0191550 A1 | 6/2016 | Ismael et al. |
| 2016/0241573 A1* | 8/2016 | Mixer ................. H04L 63/1416 |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2017/0083703 A1 | 3/2017 | Abbasi et al. |
| 2017/0213030 A1* | 7/2017 | Mooring ............... G06F 21/566 |
| 2018/0013170 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 02/006928 A2 | 3/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |

(56) References Cited

FOREIGN PATENT DOCUMENTS

| WO | 2012/075336 A1 | 6/2012 |
|---|---|---|
| WO | 2012/145066 A1 | 10/2012 |
| WO | 2013/067505 A1 | 5/2013 |

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Mining Specification of Malicious Behavior"—Jha et al, UCSB, Sep. 2007 https://www.cs.ucsb.edu/.about.chris/research/doc/esec07.sub.--mining.pdf-.
"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.isp?reload=true&amumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D. , et al., "Internet Quarantine: Requirements for Containing Self-Propagating Code", INFOCOM, vol. 3, (Mar. 30-Apr. 3, 2003), pp. 1901-1910.

(56) References Cited

OTHER PUBLICATIONS

Morales, Jose A., et al., ""Analyzing and exploiting network behaviors of malware."", Security and Privacy in communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham, "Insertion, Evasion, and Denial of Service: Eluding Network Intrusion Detection", Secure Networks, ("Ptacek"), (Jan. 1998).

\* cited by examiner

FIRST PARAMETER (OBJECT TYPE) 470

SECOND PARAMETER (PLATFORM TYPE) 472

THIRD PARAMETER (METADATA) 474

FOURTH PARAMETER (PROCESS IDENTIFIER) 476

FIFTH PARAMETER (THREAD IDENTIFIER) 478

SIXTH PARAMETER (RESOURCE TYPE) 480

SEVENTH PARAMETER (VIRTUALIZATION SCHEME) 482

EIGHTH PARAMETER (RESOURCE IDENTIFIER) 484

NINTH PARAMETER (INFORMATION TO CONDUCT VIRTUALIZATION) 486

TENTH PARAMETER (VIRTUALIZATION FLAG) 488

SELECTIVE VIRTUALIZATION FOR SECURITY THREAT DETECTION

CROSS-REFERENCE OF RELATED APPLICATIONS

This application claims the benefit of priority on U.S. Provisional Application No. 62/140,963, filed Mar. 31, 2015, the entire contents of which are incorporated by reference.

FIELD

Embodiments of the disclosure relate to the field of cyber security. More specifically, embodiments of the disclosure relate to a system and method for selectively virtualizing resources to control associations between resources and processes that are operating within a VM-based sandbox environment and are being monitored to detect a threat in the form of a malicious attack.

GENERAL BACKGROUND

Computers and other network devices deployed within an enterprise network rely on virtualization solutions for accessing system resources. For instance, applications, files or even registry values may be virtualized. However, such virtualization requires complete interception and redirection of user/application requests directed to a virtualized system resource, which can interfere with the detection of malicious behavior by the network device that is caused by an exploit or malware present in the device (generally referred to as a "security threat").

Currently, there exist security appliances that operate within an enterprise network and utilize one or more virtual machines (hereinafter referred to as "VMs") for analysis of network traffic for maliciousness. According to one deployment, each VM is configured to execute multiple processes concurrently (e.g., operating at least partially at the same time), where two or more of these processes support different versions of application software. Concurrent execution of multiple processes within a VM provides a more comprehensive threat detection solution than single process execution; however, it is extremely difficult to maintain and validate the accuracy of multiple installed applications, as well as to guarantee desired installed software configuration/plugins associations. In fact, installation of multiple versions of the same application may result in a software deployment that does not exist, and perhaps would have never existed on any end-user machine or backend server. Hence, the execution environment may not appear as a "real" machine to a security threat.

For instance, during installation of a new or updated version of application software, some older software components (e.g., dynamic-link library "dll") may be overwritten with newer versions. As a result, certain malicious attacks may not be observed. For example, multiple versions of Microsoft® Office® may be installed within a system and supported by a VM, such as Office® 2007, Office® 2010 and Office® 2013. During installation, Office® 2007 installs a first dll to the system. During installation of Office® 2010, however, the first dll may be overwritten with a newer version. The removal of the first dll may configure the VM differently than its intended configuration for threat detection, which may cause some malicious attacks to go undetected. Hence, labor intensive reviews are required to ensure that, after undergoing any type of software configuration, a VM maintains an intended software configuration, which are costly and delay malware detection product releases.

More specifically, installing application versions 3.0 and 3.1 may result in an application runtime environment that is a combination of these application versions. If application version 3.0 loads a DLL (module), reads a registry key, or configuration file belonging to version 3.1, then the code path and memory layout result in a hybrid application version 3.0', which is not equivalent to application version 3.0 or 3.1. If the area of logical change or memory layout change is the target of an exploit, the detection of the actual exploit may fail; however, such detection would have been successful, as the exploit may have run, on a real version 3.0 installation. These levels of runtime behavioral changes are difficult to validate during a quality assurance (QA) verification phase.

Additionally, each process may launch its corresponding application software with a selected software module that adds capabilities to existing application software, such as a unique version of an application plug-in. Hence, the VMs may have the same application software (e.g., Microsoft® Internet Explorer® version 9), but use different flash players (e.g., Adobe® Flash player 13 for one application version and Adobe® Flash player 16 for another application version).

The interchangeability between application software and plug-ins provides a multiplexed virtualization scheme where different versions of virtualized application software may be intentionally associated with different virtualized application plug-ins in order to increase the breadth of malware detection. However, due to the presence of time-out conditions, which require initialization of application plug-ins to be completed within a prescribed period of time after the application software has launched in the VM, it is contemplated that VMs within security appliances may not be configured with an intended application plug-in. Rather, in response to an occurrence of a time-out prior to completing initialization of an application plug-in, the virtualized application software may attempt an association with another application plug-in (e.g., a different version of application plug-in). Hence, again, the VM is now set with a configuration that is different than its intended configuration for threat detection. Without virtualization support it is very difficult to "correctly" simultaneously launch and utilize multiple plugins in multiple applications.

BRIEF DESCRIPTION OF THE DRAWINGS

Embodiments of the invention are illustrated by way of example and not by way of limitation in the figures of the accompanying drawings, in which like references indicate similar elements and in which:

FIG. 4B is an exemplary embodiment of a usage pattern for configuration of virtualization logic within the first VM of FIG. 4A and FIG. 6.

DETAILED DESCRIPTION

Figure 1:
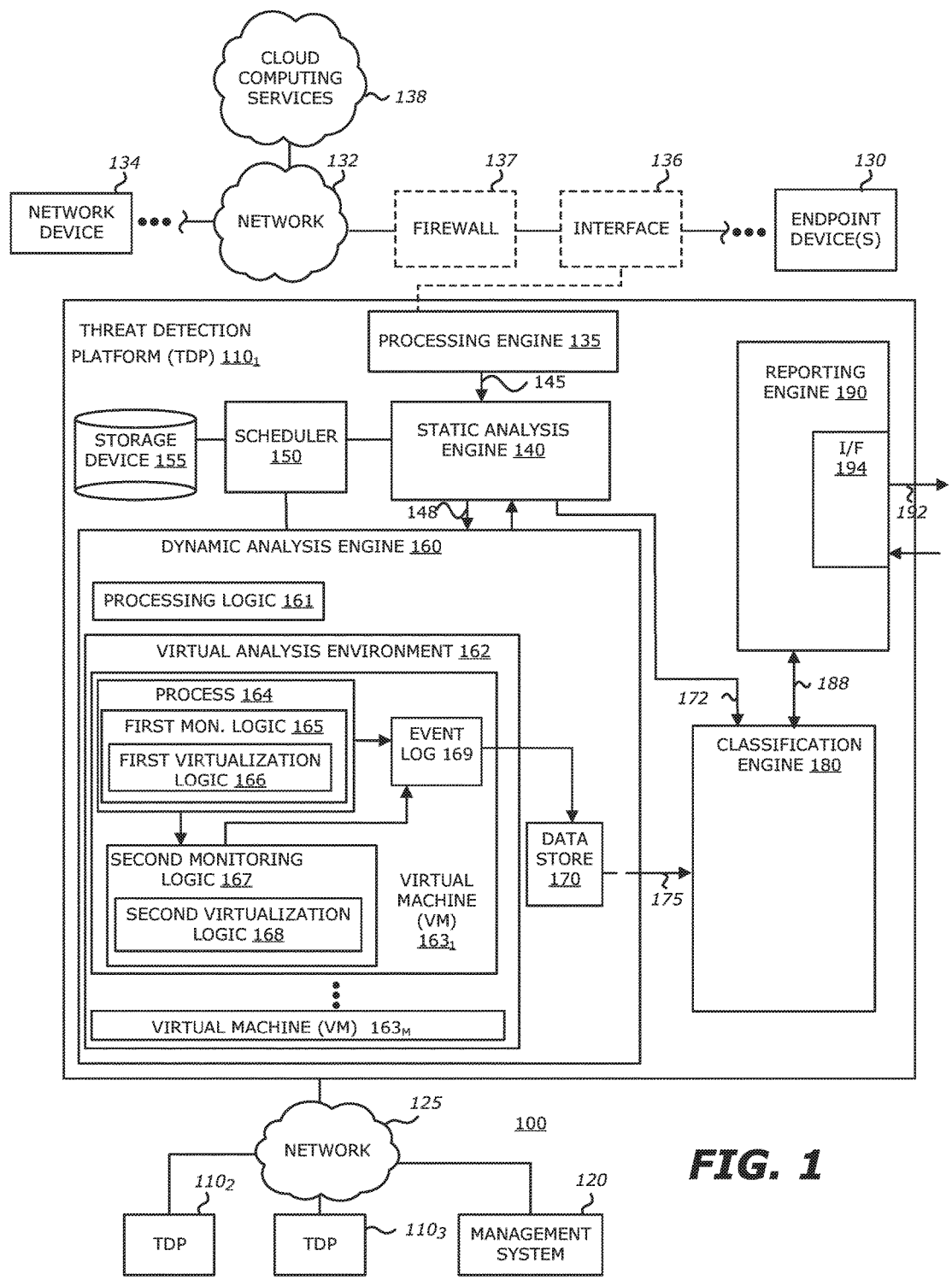
FIG. 1 is an exemplary block diagram of a network deploying a threat detection platform (TDP) that conducts selective virtualization of resources.

Various embodiments of the disclosure relate to a platform configured with logic that conducts selective virtualization of resources or even entire applications to enhance malware detection. This selective virtualization may be adapted to control the association between processes and resources in order to provide a more comprehensive analysis for the presence of exploits and/or malicious code (hereinafter collectively referred to as "malware") in an object under analysis.

According to one embodiment of the disclosure, the selective virtualization may be conducted to individual resources (e.g., files, registry key values, network ports, dynamic-link libraries, plug-in applications, etc.), which generally involves transparently modifying access to that resource and ensuring a reliable association between these resources and processes operating within a virtual machine (VM). Alternatively, the selective virtualization may be conducted in connection with a virtualized application (herein an "application package" described below). Both of these deployments may further utilize selective virtualization to obfuscate the presence of duplicated versions of resources (e.g., multiple versions of application software, dynamic-link libraries, etc.) that, if detected by malware that is present in an object under analysis, may allow the malware to evade detection by delaying activation.

According to a first embodiment of the disclosure, virtualization logic may be implemented as part of the user mode and/or the kernel mode of a virtual machine. The virtualization logic is configured to perform different virtualization operations based, at least in part, on the type of activity to be conducted to a resource in accordance with a monitored request. For instance, the virtualization logic may (i) intercept and redirect the request to a different portion of system code than originally targeted when the request is directed to a first subset of activities; and/or (ii) intercept and service the request when the request is directed to a second subset of activities.

Of course, it is contemplated that, for certain activities that are part of the first subset of activities, the data returned by the system code may be intercepted and manipulated by the virtualization logic prior to returning that data to the portion of the process that initiated the request. For instance, with respect to a Query Process request to list all active processes, the virtualization logic may intercept the returned data from the system code in order to obfuscate the presence of a certain process or processes so that it appears that a lesser number of processes are running on the platform.

More specifically, according to this embodiment of the disclosure, the virtualization logic comprises a first virtualization logic deployed in user mode of the virtual machine and a second virtualization logic deployed in kernel mode of the virtual machine. The first virtualization logic is configured to intercept and redirect a first type of request, which is associated with a particular activity that is independent of kernel involvement, to system code. Additionally, the first virtualization logic is configured to intercept a second type of request, which is associated with a particular activity that can be serviced by returning a value to a portion of the process that initiated that request.

Herein, the virtualization performed by the first virtualization logic is selective based, at least in part, on configuration data that may include a list of usage patterns provided from a source external to the VM. Each of the usage patterns comprises (1) one or more criterion that selectively control where a requested resource is subject to virtualization; and (2) the activities to be undertaken to perform such virtualization. As a result, the usage patterns provided to the first virtualization logic may differ from the usage patterns provided to the second virtualization logic. Alternatively, the configuration data, inclusive of the list of usage patterns, may be provided based on these patterns that are integrated into a VM (software) profile, implemented within a hypervisor (also referred to as a virtual machine monitor "VMM"), and/or implemented within a light hypervisor (VMM-LITE), as described below. The salient aspect is that the configuration data may be externally sourced, internally sourced, static, and/or updateable.

More specifically, the first virtualization logic may receive and store the provided usage patterns, which may be updated in a periodic or aperiodic manner. In response to detecting a request that is directed to a specific resource identified in one of the stored usage patterns, the first virtualization logic conducts one or more activities identified in that stored usage pattern. An example of such activities may involve redirecting the request by changing a file path associated with a Query Process Handle request and providing the modified Query Process Handle request to the system code. Another example may involve servicing a Query Window Handle request with a virtualized foreground window handle to account for keylogging malware that may have initiated the request.

Similarly, the second virtualization logic deployed within kernel mode may (i) intercept and redirect a third type of request, which is directed to a kernel-based activity, to the system code, and/or (ii) intercept a fourth type of request, which is directed to an activity that can be serviced by returning a value to a portion of the process that initiated the request. The first, second, third and fourth types of requests may be mutually exclusive.

The second virtualization logic receives and stores the usage patterns, which also may be updated in a periodic or aperiodic manner. In response to detecting a request that is directed to a particular system resource that matches a resource to undergo virtualization, the second virtualization logic conducts the activities identified in the stored usage pattern. An example of such activities may involve redirecting an Open File request by changing a file path to open a different file and providing the modified Open File request to the system code. Another example may involve servicing a Query Registry Value request by returning a value provided in a corresponding usage pattern.

It is contemplated that, instead of conducting virtualization of a particular resource (e.g., files, registry keys, etc.), which generally involves transparently modifying access to that resource, application software may be virtualized at the time of installation, thereby creating corresponding virtualized application packages. Each virtualized application package comprises registry data, file data, and other information that emulates the functionality of the virtualized application. This allows for virtualization of resources by fetching data within the virtualized application and/or obfuscation of different versions of applications running in the VM.

According to a second embodiment of the disclosure, instead of configuring the VM to conduct virtualization within the user mode and kernel mode, the virtualization logic may be deployed within a hypervisor. The hypervisor is configured to intercept and redirect requests associated with a first subset of activities as well as to intercept and service requests associated with a second subset of activities, as described below.

According to a third embodiment of the disclosure, instead of configuring the VM to conduct virtualization within the user mode and kernel mode as described in connection with the first embodiment, the virtualization logic may be deployed within a thin-hypervisor (sometimes referred to as an "light hypervisor"). In lieu of redirecting requests to system code, however, the light hypervisor is configured to route the redirected requests to the kernel mode and user mode of the platform for processing.

I. Terminology

In the following description, certain terminology is used to describe aspects of the invention. For example, in certain situations, both terms "logic" and "engine" are representative of hardware, firmware and/or software that is configured to perform one or more functions. As hardware, logic (or engine) may include circuitry having data processing or storage functionality. Examples of such processing or storage circuitry may include, but is not limited or restricted to a (hardware) processor; one or more processor cores; a programmable gate array; a microcontroller; an application specific integrated circuit; receiver, transmitter and/or transceiver circuitry; storage medium including semiconductor memory or a drive; or combinatorial logic, or combinations of one or more of the above components.

Logic (or engine) may be in the form of one or more software modules, such as executable code in the form of an executable application, an application programming interface (API), a subroutine, a function, a procedure, an applet, a servlet, a routine, source code, object code, a shared library or dynamic-link library (dll), or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device; and/or a semiconductor memory. As firmware, the executable code is stored in persistent storage.

The term "object" generally refers to a collection of data, whether in transit (e.g., over a network) or at rest (e.g., stored), often having a logical structure or organization that enables it to be classified for purposes of analysis. During analysis, for example, the object may exhibit a set of expected behaviors. The object may also exhibit a set of unexpected behaviors systematic of malicious activity that may provide evidence that the object may be classified as malicious.

In general, a "process" is an instance of software that is executed, sometimes in a virtual environment, for the processing of an object. It is contemplated that multiple processes may operate concurrently within a virtual machine or may operate successively with one process that is active (running) with any other processes being placed in an inactive (wait) state. A process may include multiple threads of execution ("threads"), where each thread is responsible for conducting different operations to the object and may operate successively or concurrently within the process. The processes and/or threads may share state information, memory and other resources.

A "platform" generally refers to an electronic device with connectivity to an external data source (e.g., network, other electronic device, etc.) that typically includes a housing that protects, and sometimes encases, circuitry with data processing and/or data storage. Examples of a platform may include a server or an endpoint device that may include, but is not limited or restricted to a stationary or portable computer including a desktop computer, laptop, electronic reader, netbook or tablet; a smartphone; a video-game console; or wearable technology (e.g., smart watch, etc.).

A "request" generally refers to information transmitted in a prescribed format that is requesting a particular activity to occur, normally in connection with various types of resources. Examples of these types of resources may include a file, a registry key, a socket (network) or other connector.

The term "transmission medium" is a physical or logical communication path with an endpoint device. For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Referring to FIG. 1, an exemplary block diagram of a network 100 deploying a plurality of threat detection platforms (TDP) $110_1$-$110_N$ (N>1, where N=3 for this embodiment) communicatively coupled to a management system 120 via a network 125 is shown. In general, the management system 120 is adapted to manage each TDP $110_1$-$110_3$. For instance, the management system 120 may be configured to perform content updates within a processing engine 135 operating as part of a communication interface, a static analysis engine 140, a dynamic analysis engine 160, a classification engine 180, and/or a reporting engine 190 with an optional user interface capability. For example, the content update may include rules changes (e.g., add/delete/modify rules or parameters that are utilized by the rules, etc.), which may be used by the static analysis engine 140 and/or the dynamic analysis engine 160 to detect malicious behavior. Another content update may include changes to usage patterns, which are utilized by virtualization logic within the dynamic analysis engine 160 to selectively determine whether or not to virtualize a particular resource (e.g., a requested service to a particular software component that is needed for functionality of an application) or even an entire application, as described below.

As shown in FIG. 1, a first threat detection platform (TDP) $110_1$ is an electronic device that is adapted to analyze information associated with incoming data (e.g., network traffic propagating over a communication network 132, input data from another type of transmission medium including a dedicated transmission medium, etc.). As this illustrative embodiment, the first TDP $110_1$ is communicatively coupled with the communication network 132 via an interface 136, where the communication network 132 may include a public network such as the Internet, a private network (e.g., a local area network "LAN", wireless LAN, etc.), or a combination thereof. The interface 136 operates as a data capturing device that intercepts (or alternatively duplicates) at least a portion of incoming data and perhaps its corresponding metadata. Alternatively, although not shown, the interface 136 may be configured to receive files or other objects that are not provided over a network. For instance, as an example, the interface 136 may be a data capturing device that automatically (or on command), accessing data stored in a storage system or another type of interface, such as a port, for receiving objects manually provided via a suitable dedicated communication link or from storage media such as portable flash drives.

In some embodiments, although not shown, interface 136 may be contained within the first TDP $110_1$. In other embodiments, the interface 136 can be integrated into an intermediary device in the communication path (e.g., a firewall, router, switch or other networked electronic device) or can be a standalone component, such as an appropriate commercially available network tap.

For this illustrative embodiment, however, the interface 136 may be configured to capture data that includes at least one object for analysis, and perhaps its corresponding metadata (or generate metadata based on the captured data). The metadata may be used, at least in part, to determine protocols, application types and other information that may be used by logic (e.g., scheduler 150 or virtual machine monitor) within the first TDP $110_1$ to determine particular software profile(s) used for virtual machine (VM) configuration and/or VM operation scheduling. For instance, the software profile(s) may be used for selecting and/or configuring one or more virtual machines (VMs) $163_1$-$163_M$ (M≥1) within a virtual analysis environment 162 of the dynamic analysis engine 160. These software profile(s) may be directed to different software or different versions of the same software application extracted from software image(s) fetched from a storage device 155.

As further shown in FIG. 1, the first TDP $110_1$ includes processing engine 135, static analysis engine 140, scheduler 150, storage device 155, dynamic analysis engine 160, classification engine 180, and/or reporting engine 190. Herein, the processing engine 135 receives an object and converts that object into a format, as need or appropriate, on which deep scanning by the static analysis engine 140 if implemented in the first TDP 110. This conversion and scanning may involve decompression of the object, decompilation of the object, extraction of specific data associated with the object, and/or emulation of the extracted data (like Javascript).

The static analysis engine 140 may include processing circuitry that is responsible for extracting and/or generating metadata contained within and/or associated with incoming data from the processing engine 135 (e.g., network traffic, downloaded data). This metadata may be subsequently used for configuring one or more VMs $163_1$-$163_M$ within the virtual analysis environment 162 for conducting a dynamic analysis of the object associated with that metadata.

Referring still to FIG. 1, the static analysis engine 140 analyzes features for one or more incoming objects 145, which may be a portion of network traffic (or downloaded data) according to this embodiment of the disclosure. Such analysis may involve the performance of one or more checks on the object 145 without its execution. Examples of the checks may include signature matching to conduct (a) exploit signature checks, which may be adapted to compare at least a portion of the object under analysis with one or more pre-stored exploit signatures (pre-configured and pre-determined attack patterns) from signature database (not shown), and/or (b) vulnerability signature checks that may be adapted to uncover deviations in messaging practices (e.g., non-compliance in communication protocols, message formats or ordering, and/or payload parameters including size). Other examples of these checks may include (i) heuristics, which is based on rules or policies as applied to the object and may determine whether one or more portions of the object under analysis is associated with an anomalous or suspicious characteristic (e.g., a particular URL associated with known exploits, or a particular source or destination address etc.) associated with known exploits; or (ii) determinative rule-based analysis that may include blacklist or whitelist checking.

Upon static analysis of the features of the object 145, the static analysis engine 140 determines whether this object is "suspicious," namely the object 145 has features that suggest it is associated with a malicious attack. As a result, the static analysis engine 140 may pass this suspicious object 148 to the dynamic analysis engine 160 for more in-depth analysis in a VM-based operating environment.

More specifically, after analysis of the features of the object 145 has been completed, the static analysis engine 140 may provide some or all of the object 145 as the suspicious object 148 to the dynamic analysis engine 160 for in-depth dynamic analysis by one or more VMs $163_1$-$163_M$ of the virtual analysis environment 162. For instance, according to one embodiment of the disclosure, a first VM $163_1$ may be adapted to execute one or more processes (e.g., process 164) for processing the suspicious object 148 and conduct selective virtualization during such processing.

Herein, according to one embodiment, the first VM $163_1$ executes process 164, which processes suspicious object 148 and the behaviors during such processing are captured by a first monitoring logic 165 and a second monitoring logic 167. Operating in conjunction or closely with the process 164, the first monitoring logic 165 comprises first virtualization logic 166, which is configured to intercept requests initiated (by process 164) during processing of the suspicious object 148. In response to detecting requests associated with a first subset of activities that are handled by the first VM 163$_1$ in user mode (e.g., actions or inactions associated with a time query, a process handle query, etc.), the first virtualization logic 166 determines whether a resource associated with the request is to be virtualized. Such virtualization ensures an association between process 164 executing in the first VM 163$_1$ and specific resources in an effort to improve threat detection and/or obfuscate the presence of duplicated versions of an application and/or resource that may identify to malware that it is executing within a sandbox environment.

For instance, in response to a request for a handle for a particular application plug-in utilized by application software associated with the process 164, the first virtualization logic 166 accesses stored configuration data, perhaps including usage patterns or an application package, to determine whether the application plug-in is to be virtualized. If, according to the configuration data, the application plug-in identified in the request is to be virtualized to another version (or type) of application plug-in, the first virtualization logic 166 may redirect the request by altering a pointer contained in the request to a different application plug-in. As a result, the handle for the different application plug-in is returned to the portion of the process 164 that initiated the request.

Another virtualization operation may involve the first virtualization logic 166 receiving a time-of-day request, where the process 164 may be configured to focus its analysis on whether the suspicious object 148 includes time-bomb malware. Hence, the process 164 accesses stored configuration data to detect whether the resource (e.g., time-of-day value) is to be virtualized, and in response, the first virtualization logic 166 may service the request by altering the time-of-day to a time value different than the actual time in order to better detect time-bomb malware.

Additionally, in response to detecting requests associated with a second subset of activities that are handled by the first VM 163$_1$ in kernel mode (e.g., opening file, changing a registry key value, and/or establishing a network connection), the second virtualization logic 168 determines whether a system resource associated with the request is to be virtualized. This may be accomplished by the second virtualization logic 168 accessing stored configuration data, perhaps including usage patterns or the application package to determine whether the system resource associated with the request is to be virtualized. If so, the second virtualization logic 168 alters the system resource (e.g., pointer to a first file) to a virtualized resource (e.g., pointer to a second file that is different than the first file). As a result, for this example, the second (virtual) file is opened in lieu of the first file.

Referring still to FIG. 1, the scheduler 150 may be adapted to configure one or more VMs 163$_1$-163$_M$ based on metadata associated with the suspicious object 148 in order to process the suspicious object 148 at a desired time, for a desired period of time and/or in a desired order. For instance, the first VM 163$_1$ may be configured to run multiple processes, each configured with a different software profile corresponding to software images stored within storage device 155. As an alternative embodiment, the first VM 163$_1$ may be configured to run multiple processes, each configured according to a software configuration that may be used by an electronic device connected to a particular enterprise network (e.g., endpoint device(s) 130) or a prevalent type of software configuration (e.g., a particular version of Windows® OS and/or a particular version of a web browser with a particular application plug-in). The processes run in the first VM 163$_1$ may be performed concurrently or sequentially. Of course, it is contemplated that the VM configuration described above may be handled by logic other than the scheduler 150.

According to one embodiment of the disclosure, the dynamic analysis engine 160 may be adapted to execute one or more VMs 163$_1$-163$_M$ that simulate processing of the suspicious object 148 within a run-time environment. For instance, dynamic analysis engine 160 may include processing logic 161 to provide anticipated signaling to the VM(s) 163$_1$, . . . , and/or 163$_M$ during virtual processing, and as such, emulate a source of and/or destination for communications with the suspicious object 148. As an example, the processing logic 161 may be adapted to operate in combination with process 164 to provide simulated key inputs from a keyboard, keypad or touch screen, as requested by the suspicious object 148.

Figure 2:
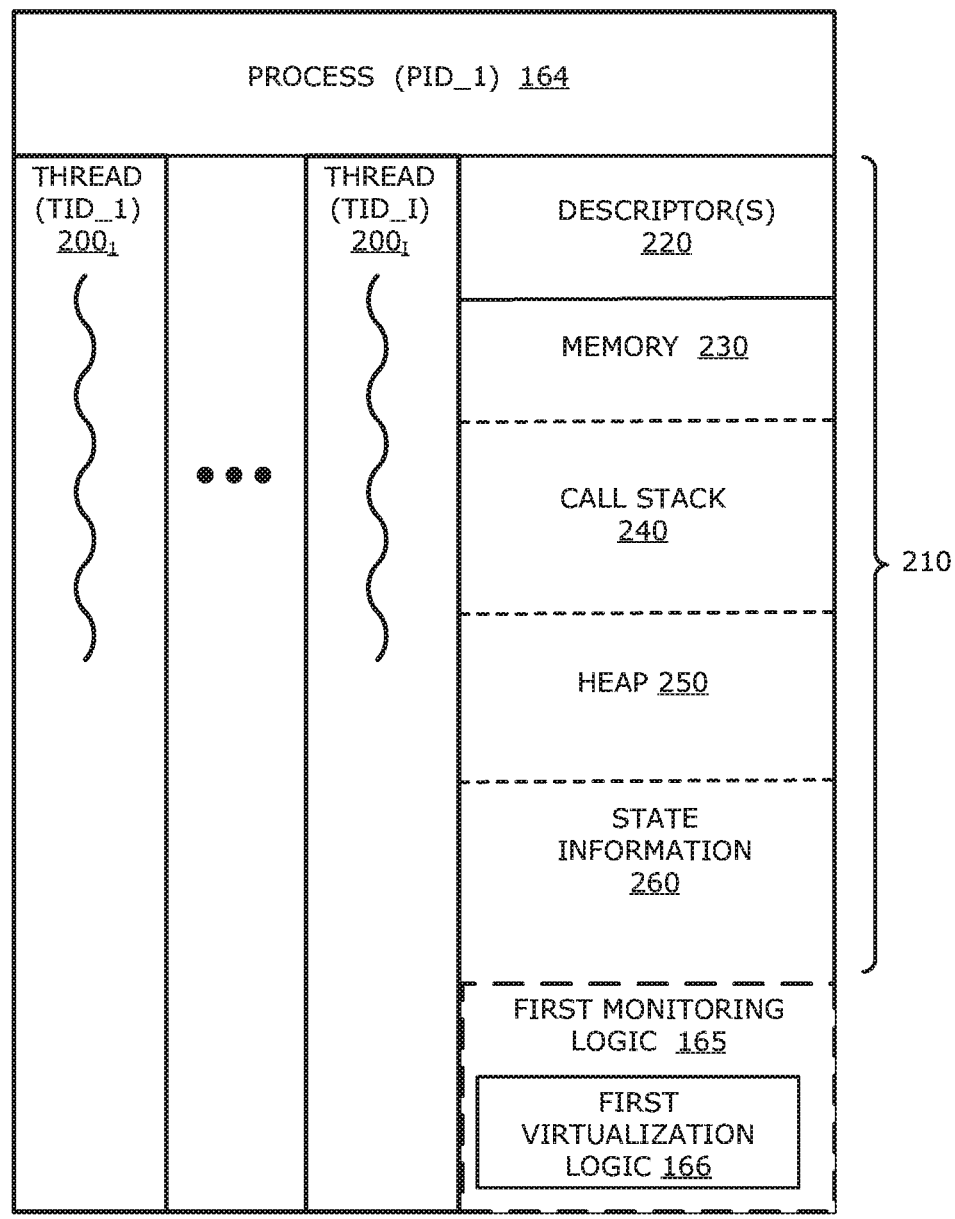
FIG. 2 is an exemplary block diagram of a process with its threads, resources, and logic operating in accordance with one embodiment of the invention.

More specifically, as shown in FIG. 2 as an illustrative embodiment, the process 164 comprises one or more threads 200$_1$-200$_I$ (e.g., I≥1) that may operate concurrently and/or sequentially with each other in order to perform various operations with respect to the suspicious object 148. One of these threads 200$_1$-200$_I$ (e.g., first thread 200$_1$) may be directed to opening a browser application that is handled by the second monitoring logic 167 while another thread (e.g., second thread 200$_2$) may be directed to an operation of fetching the window handle (name) or an actual time of processing, which is handled by the first monitoring logic 165.

Applications may have a single thread 200$_1$ of execution or I-number of threads, 200$_1$-200$_I$. The cases discussing multiple threads of interactions may degenerate to the single thread cases. Not all processes have multiple threads.

The processing of the first thread 200$_1$ may cause certain activities to occur such as opening the browser application, where other threads (not shown) may cause other activities to occur (e.g., establishing I/O connections, detecting keystrokes, and/or displaying data). These activities (sometimes also referred to as "events") are monitored by second monitoring logic 168. In contrast, the processing of the second thread 200$_2$ may cause certain events to occur such as accessing a real-time clock, where if the event is to be virtualized, may service a different time than provided by the real-time clock.

As still shown in FIG. 2, the process 164 comprises an instance of executable software which may include (1) multiple threads of execution 200$_1$-200$_I$ that may execute instructions concurrently and (2) software components 210 for the process 164. For instance, as shown, the process 164 includes descriptors 220 for resources that are allocated to the process 164 (e.g., process handles, etc.) and a memory 230 (e.g., a region of virtual memory). The memory 230 may be adapted to store a call stack 240 that keeps track of active subroutines and/or other events, a heap 250 to hold intermediate computation data generated during run time, and/or state information 260 (context) such as the content of registers, physical memory addressing or the like during thread execution. The first monitoring logic 165 operations in conjunction with the process 164, and may be injected as part of the process 164 or separate from the process 164.

Referring to both FIG. 1 and FIG. 2, depending on the type of activity associated with a request initiated by the process 164 (or threat 200$_1$), the first virtualization logic 166 or the second virtualization logic 168 is configured to intercept the request. In response to determining that resources pertaining to the request are to be virtualized in accordance with the usage patterns associated with user-mode based activities, the first virtualization logic 166 either (i) performs redirection operations on the request before passing the request to the system code or (ii) services the request by providing data back to the portion of the process 164 (or thread $200_1$) initiating the request. Similarly, in response to determining that resources pertaining to the request are to be virtualized in accordance with the usage patterns associated with kernel-mode based activities, the second virtualization logic 168 either (i) performs redirection operations on the request before passing the request to the system code or (ii) services the request by returning data to the portion of the process 164 that initiated the request. Both the first monitoring logic 165 and the second monitoring logic 167 communicate information associated with the events and their corresponding event metadata into an event log 169, where the logged events may include all of the events or a subset of the monitored events such as anomalous events as described above. It is contemplated that the event log 169 may be located as storage for the first VM $163_1$ or may be storage residing in the hypervisor (VMM) of FIG. 7, the light hypervisor of FIG. 9, or host software layers.

Referring to FIG. 1, the dynamic analysis engine 160 provides VM-based results 175 to the classification engine 180. According to one embodiment of the invention, the VM-based results 175 include information associated with the detected events for a particular process. According to one embodiment of the disclosure, the classification engine 180 includes logic that is configured to receive the VM-based result 175. Based at least partially on the VM-based results 175 that includes information associated with the monitored events associated with each process (and/or results 172 from static analysis engine 140), the classification engine 180 evaluates the events to determine whether the suspicious object 148 should be classified as "malicious," where the object 148 is now considered to be associated with a malicious attack.

As shown in FIG. 1, the reporting engine 190 is configured to receive information from the object classification engine 180 and generate alerts 192, especially in response to the suspicious object 148 being now classified as malicious. The alerts may include various types of messages, which may include text messages and/or email messages, video or audio stream, or other types of information over a wired or wireless communication path. The reporting engine 190 features an optional user interface 194 (e.g., touch pad, keyed inputs, etc.) for customization as to the reporting configuration.

Figure 3:
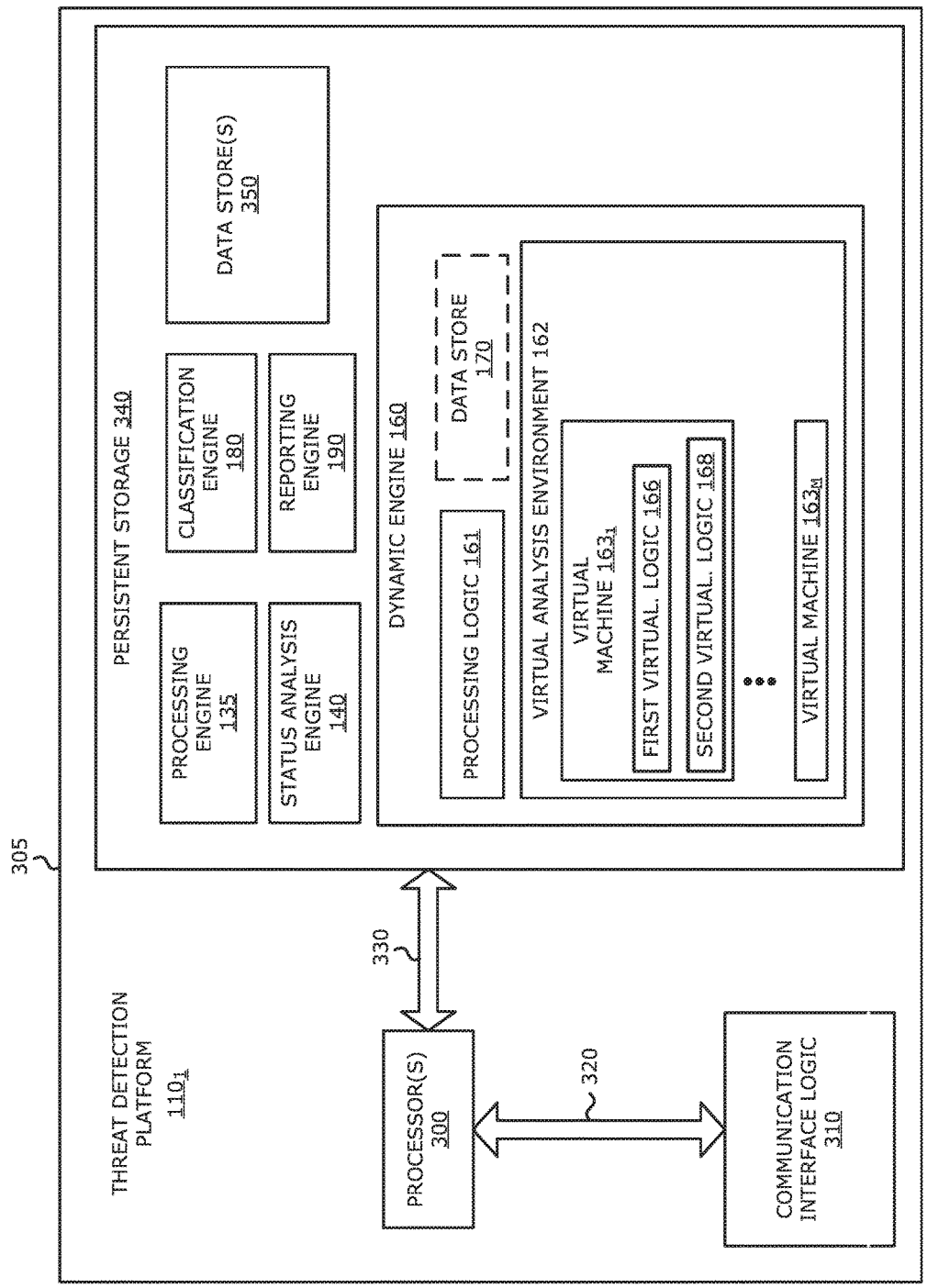
FIG. 3 is an exemplary embodiment of a logical representation of the first TDP of FIG. 1.

Referring now to FIG. 3, an exemplary embodiment of a logical representation of the first TDP $110_1$ is shown. The first TDP $110_1$ includes a housing 305, which is made entirely or partially of a hardened material (e.g., hardened plastic, metal, glass, composite or any combination thereof) that protect circuitry within the housing 305, namely one or more processors 300 that are coupled to communication interface logic 310 via a first transmission medium 320. Communication interface logic 310 enables communications with other TDP $110_2$-$110_3$ and management system 120 of FIG. 1. According to one embodiment of the disclosure, communication interface logic 310 may be implemented as a physical interface including one or more ports for wired connectors. Additionally, or in the alternative, communication interface logic 310 may be implemented with one or more radio units for supporting wireless communications with other electronic devices.

Processor(s) 300 is further coupled to persistent storage 340 via a second transmission medium 330. According to one embodiment of the disclosure, persistent storage 340 may include (a) processing engine 135; (b) static analysis engine 140; (c) the dynamic analysis engine 160 that includes the processing logic 161 and the virtual analysis environment 162 that includes VM(s) $163_1$-$163_M$ with at least some of which including virtualization logic 166/168; (d) classification engine 180; (e) reporting engine 190; and/or (f) one or more data stores 350 that are utilized by processing engine 135, static analysis engine 140, dynamic analysis engine 160, classification engine 180, and/or reporting engine 190. Of course, when implemented as hardware, one or more of these engines (or logic units) could be implemented externally from the first TDP $110_1$.

Collective logic within the dynamic analysis engine 160 may be configured to monitor and virtualize certain resources in order to enhance malware detection by (1) ensuring that certain resources are associated with certain processes so that desired virtual environments are maintained for testing; (2) obfuscating duplicative resources to provide an appearance of a normal operating environment to objects under analysis; and/or (3) alter the operating environment to customize to a particular environment that may be subject to a higher frequency of attack (e.g., content of a network device maintained by a high-ranking government employee, officer of a company, etc.).

III. VM-Based Selective Virtualization

Figure 4A:
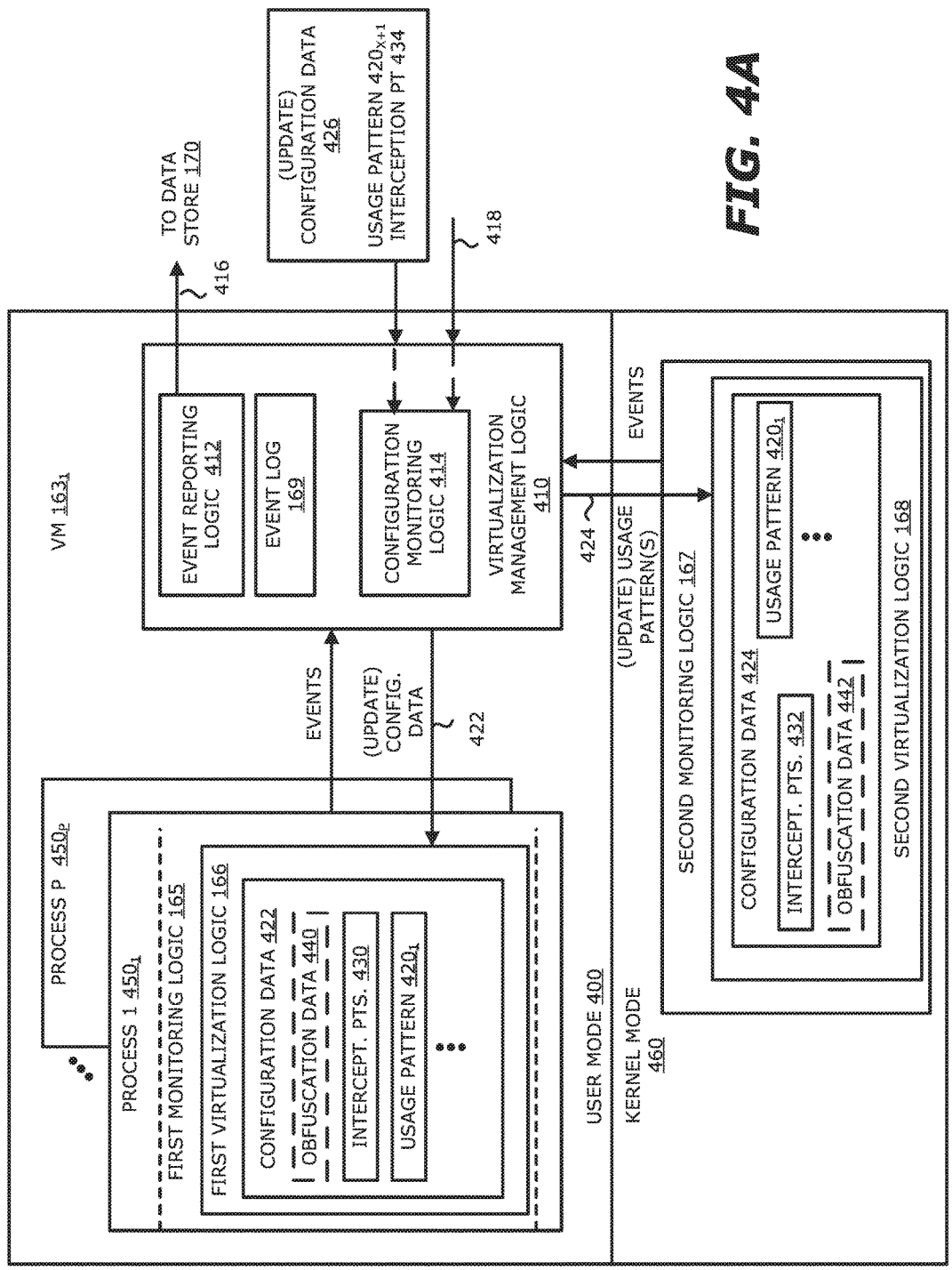
FIG. 4A is a first exemplary embodiment illustrating a logical representation of a first virtualization logic and a second virtualization logic that are configured to conduct selective virtualization of resources within a first virtual machine (VM) operating within the first TDP of FIG. 1.

Referring to FIG. 4A, a first representation of virtualization logic within the first VM $163_1$ is shown, where this logic is configured to conduct selective virtualization of requested resources. At the time of configuration, the first VM $163_1$ may be installed with the first virtualization logic 166 (which may be part of the first monitoring logic 165), the second virtualization logic 168 (which may be part of the second monitoring logic 167), and virtualization management logic 410. As shown, the virtualization management logic 410 may be located in the User mode 400 of the Guest VM $163_1$ for illustrative purposes. Of course, it is contemplated that the virtualization management logic 410 may be located in the Kernel mode 460 of the Guest VM $163_1$, in the hypervisor (VMM) 700 of FIG. 7, or the light hypervisor (VMM-LITE) 800 of FIG. 9. Similarly, the virtualization management logic 410 may be distributed in more than one layer. For example, the virtualization management logic 410 may split between Kernel mode 460 and VMM/UV layers.

Figure 6:
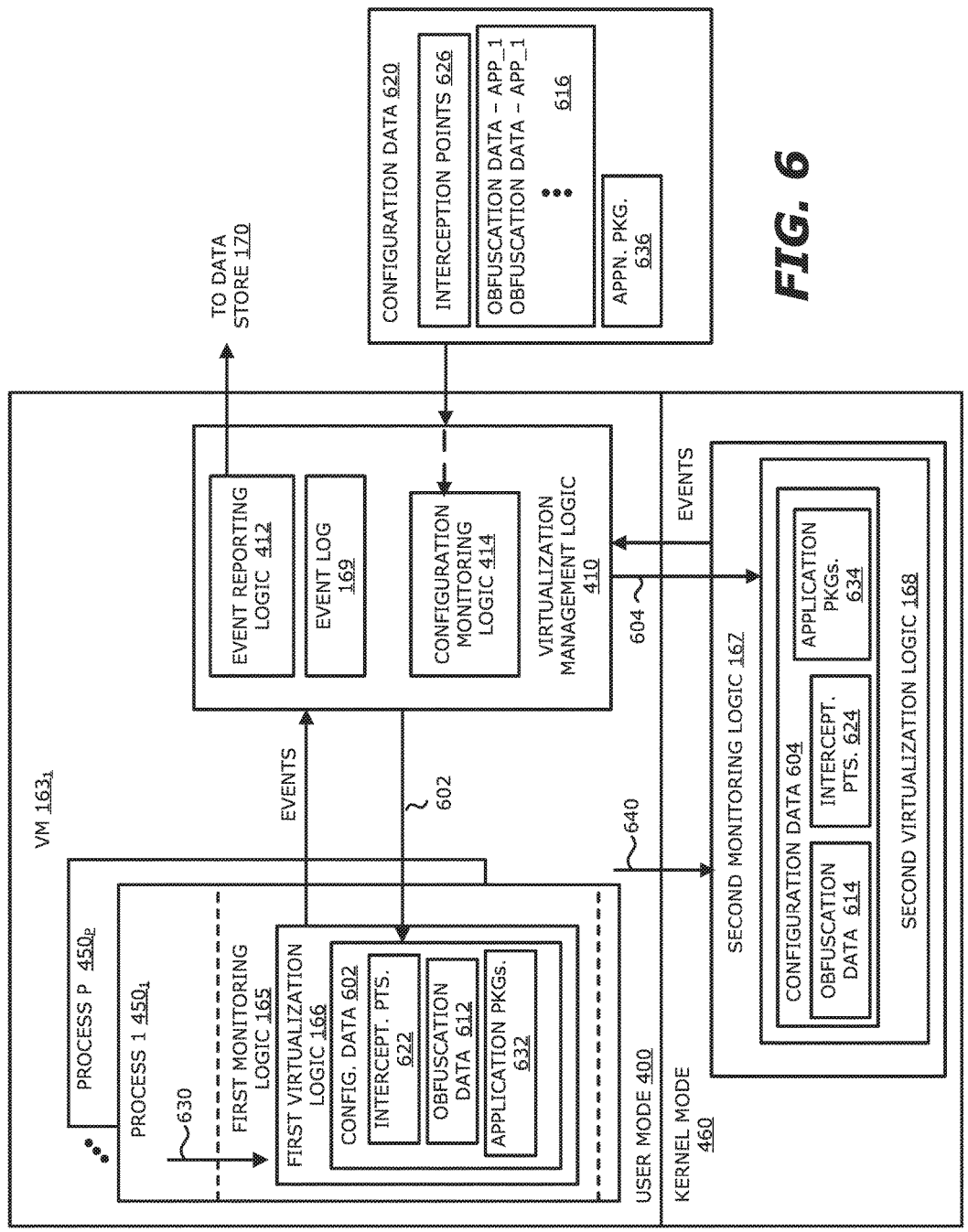
FIG. 6 is a second exemplary embodiment illustrating a logical representation of the first virtualization logic and the second virtualization logic that performs selective virtualization of resources within the first TDP of FIG. 1.

The virtualization management logic 410 is responsible for configuring the user-mode configuration data 422 and 602 in FIG. 4A and FIG. 6, respectively. The virtualization management logic 410 is also responsible for configuring the kernel-mode configuration data 424 and 604 in FIG. 4A and FIG. 6, respectively. Of course, according to one embodiment of the disclosure, the first virtualization logic 166 and second virtualization logic 168 may directly implement hard-coded configuration data with minimal management overhead required, where updated configuration data may or may not be available via the virtualization management logic 410. Other embodiments envisioned may support varying degrees of configurability and remoteness of the source configuration data.

According to one embodiment of the disclosure, the first virtualization logic 166 is initially configured with access to virtualization configuration data 422 (hereinafter "configuration data"), which includes interception points 430 (e.g., hooks, breakpoints, filter drivers, etc.) that are used to identify selected requests for a resource or multiple resources that are to be virtualized.

For some embodiments, as shown for resource-specific virtualization in FIG. 4A, the configuration data 422 may further include a plurality of usage patterns $420_1$-$420_X$ (X≥1), where each usage pattern $420_1$, . . . , or $420_X$ may be associated with one or more interception points 430. An usage pattern $420_1$, . . . , or $420_X$ specifies a particular resource or resources to virtualize and the activities conducted for such virtualization. Of course, it is contemplated that, in lieu of usage patterns $420_1$-$420_X$ that are resource specific, another embodiment of the configuration data 422 may include a complete set of resources associated with a particular application, namely an application package that comprises registry data, file data, or other information that emulates the functionality of this virtualized application, which is represented as part of configuration data 602 illustrated in FIG. 6.

Additionally, the configuration data 422 may optionally include obfuscation data 440 that is used by the first virtualization logic 166 to obfuscate the presence of a resource or an entire set of resources (e.g., application package in FIG. 6) to avoid detection of such resource(s). For instance, handles may be substituted, data obtained from a Query request may be removed or added, error messages may be created, or the like. Illustrative examples of obfuscation that is controlled through use of the obfuscation data 422 by the first virtualization logic 166 may include, but are not limited or restricted to the following: (1) preventing display of certain information directed to a particular resource; (2) altering certain information associated with the resource so that it appears to be present in a platform represented by the first VM $163_1$, and/or (3) renaming the resource.

It is contemplated that the configuration data 424, which is accessible to the second virtualization logic 168, may be identical or substantially identical to the configuration data 422 (e.g., identical usage patterns but different interception points), as shown. For instance, the interception points 430 accessible to the first virtualization logic 166 may differ from the interception points 432 accessible to the second virtualization logic 168. Alternatively, it is contemplated that the configuration data 422 may differ from the configuration data 424, as the usage patterns that are part of the configuration data 422 may differ from the usage patterns that are part of the configuration data 424 and/or the obfuscation data 440 that is part of the configuration data 422 may differ from the obfuscation data 442 that is part of the configuration data 424.

In general, each of the plurality of usage patterns $420_1$-$420_X$ may include criteria to selectively control which resources are subject to virtualization. Also, each of the plurality of usage patterns $420_1$-$420_X$ identifies the activities to be undertaken to perform such virtualization. According to one embodiment of the disclosure, as shown in FIG. 4B as an illustrative example, each of the plurality of usage patterns $420_1$-$420_X$ (e.g., usage pattern $420_1$) may include a plurality of parameters 465, where each of these parameters represents a criterion in determining whether or not to perform virtualization in generating a virtualized resource in a response to a request for that resource. These parameters 465 are mutually exclusive, namely any combination of parameters 465 may be used in determination whether virtualization is conducted.

As an illustrative example, with respect to usage pattern $420_1$, a first parameter 470, a second parameter 472 and/or a third parameter 474 may represent factors that are used to selectively determine whether to conduct a virtualization of one or more requested resources. These factors may be used to restrict the virtualization activities associated with the usage pattern $420_1$ based on the particular type of object under analysis, the particular type of platform on which the object is being processed, or other metadata that further characterize the object and/or platform type.

For instance, as shown in FIG. 4B, the first parameter 470 may identify a particular type of object (or types of objects) that are subject to virtualization in accordance with the usage pattern $420_1$. Examples of object types may include executables (exe), dynamic-linked library (dll), or portable document format (pdf). Similarly, the second parameter 472 may identify the particular type of platform (e.g., email server, web server, forensic appliance, endpoint device, etc.) that is subject to virtualization in accordance with the usage pattern $420_1$. The third parameter 474 may identify further restrictions on the object or platform type (e.g., assigned a certain Internet Protocol "IP" address, a manufacture code, MAC address range, etc.) that is subject to virtualization in accordance with the usage pattern $420_1$. These factors are provided, as it is foreseeable that different virtualization schemes may be conducted depending on the particular object and/or platform that is conducting the virtual analysis of the object.

As further shown in FIG. 4B, usage patterns $420_1$ may further include other parameters that provide additional factors used to selectively control the virtualization of resources. For instance, a fourth parameter 476 is configured to include information that identifies one or more processes subject to this particular usage pattern $420_1$ (hereinafter "process identifier"). For instance, virtualization may be restricted to a particular type of browser applications (e.g., FireFox®) or multiple types of browser applications (e.g., FireFox®, Chrome®, etc.).

As further shown in FIG. 4B, a fifth parameter 478 is configured to include information that identifies one or more threads subject to this particular usage pattern $420_1$ (hereinafter "thread identifier") where virtualization at a thread-level is conducted. A sixth parameter 480 may identify the type of resource to which this particular usage pattern $420_1$ is directed, such as a handle, a file, or a registry key for example. A seventh parameter 482 may identify the particular virtualization scheme associated with the usage pattern $420_1$. One virtualization scheme involves intercepting and servicing a request while another virtualization scheme involves intercepting and redirecting access to a different resource than identified in the request.

Additionally, an eighth parameter 484 may include an identifier of the particular resource that is to undergo virtualization (e.g., a particular handle, a path for accessing data such as a file path, a particular registry key value, etc.), and a ninth parameter 486 may include virtualized data for use in conducting the virtualization operation (e.g., an alternative handle, an alternative path, etc.).

As an optional feature, usage patterns directed to the redirection virtualization scheme (e.g., usage pattern $420_1$) may further include a tenth parameter 488 that represents a virtualization flag to identify when virtualization occurs for an "intercept and redirect" virtualization scheme. Herein, the virtualization flag 488 may represent with a tri-state value; namely (1) "Enable" for virtualization of pre-operation data (prior to conducting operations associated with the request), (2) "Enable" for virtualization of post-operation data (data after conducting operations associated with the request), and (3) "Enable" for various output operations (Pre-operation and Post-operation).

According to one illustrative embodiment, the actual implementation may involve a multi-bit flag. As an illustrative example, the operations of the virtualization flag may comprise the following: (1) setting a first bit causes virtualization to occur at the input (pre-operation); (2) setting of a second bit causes virtualization to occur at the output (post-operation), in connection with the information returned from the system code; (3) setting of a third bit causes a first type of virtualization scheme to be conducted (e.g., intercept and service); and (4) setting of a fourth bit causes a second type of virtualization scheme (e.g., intercept and redirect) to be conducted. Of course, alternatively, another detection scheme besides use of a virtualization flag, such as a parameterized algorithm for example, may be used.

Referring back to FIG. 4A, during run time, within the user mode 400, the first VM $163_1$ executes one or more processes $450_1$-$450_P$ (P≥1, where a first process $450_1$ is equivalent to process 164). Herein, the first process $450_1$ is initiated to process the suspicious object 148 of FIG. 1, and some or all of the events detected during processing of the suspicious object 148 are monitored by the first monitoring logic 165 and reported to the event log 169.

The virtualization management logic 410 includes the event log 169, event reporting logic 412 and configuration monitoring logic 414. According to one embodiment of the disclosure, the event reporting logic 412 is responsible for generating data 416 associated with the monitored events, which may be uploaded into the data store 170 and subsequently included as part of the VM-based results 175 provided to the classification engine 180 as illustrated in FIG. 1.

The configuration monitoring logic 414 is configured to detect an update 426 to the configuration data 422 and/or 424, which may be downloaded from management system 120, cloud services 138 and/or another TDP (e.g., TDP $110_2$ or $110_3$) of FIG. 1. These updates 426 may include, but are not limited or restricted to any or all of the following: (i) an additional interception point 434 to be added to interception points 430 and/or 432 (as shown); (ii) an additional usage pattern $420_{X+1}$ to be added to configuration data 422 and/or 424 (as shown); (iii) additional obfuscation data 444 to be added to obfuscation data 440 and/or 442 (as shown); (iv) a modification to an existing interception point that is part of interception points 430 and/or 432; (v) a modification to an existing usage pattern that is part of usage patterns $420_1$-$420_X$; (vi) a modification to existing obfuscation data that is part of obfuscation data 440 and/or 442; (vii) a deletion of an existing interception point that is part of interception points 430 and/or 432; (viii) a deletion of an existing usage pattern that is part of usage patterns $420_1$-$420_X$; and/or (ix) a deletion of existing obfuscation data that is part of obfuscation data 440 and/or 442 within configuration data 422 and/or 424.

Additionally or in the alternative, in lieu of simply uploading and subsequent using the update configuration data 426 without modification, the content within one or more of the update usage patterns $426_{X+1}$ may be altered prior to passing them to (i) the first virtualization logic 166 to update the configuration data 422 and/or (ii) the second virtualization logic 168 to update the configuration data 424. Modification in the content of one or more of the usage patterns, interception points and/or obfuscation data within configuration data 422/424 may be conducted by configuration monitoring logic 414 based on signaling 418 from an external source. The signaling 418 allows for customization of usage patterns, interception points and/or obfuscation data by a network administrator, which provides selective virtualization on a per customer basis.

As an illustrative example, when flash dlls are switched between multiple versions of a browser application, the flash-version/browser-version association may be dynamic in nature. Based on an external input, a first version of a browser application may be selected to operate with a particular flash version on a flash dll list. Subsequently, a different version of the browser application may be selected, but based on external input, the same particular flash version may get associated with this version of the browser application. In general terms, associations between resources and/or processes can be selectively controlled by the customer.

Referring still to FIG. 4A, the first virtualization logic 166 is responsible for selectively virtualizing resources requested by the first process $450_1$ (or thread $200_1$) operating within the first VM $163_1$ in user mode 400. The requested resources may include process handle queries, window handle queries (e.g., query for handle of the foreground window), time-of-day queries, or the like. The second virtualization logic 168 is responsible for selectively virtualizing resources requested by the first process $450_1$ that are normally handled in the kernel mode 460. These requested resources may include operations directed to file management (e.g., opening file, closing file, etc.), registry key management (e.g., obtaining registry key values), and/or network management (e.g., establish network connection, etc.) for example.

Figure 5A:
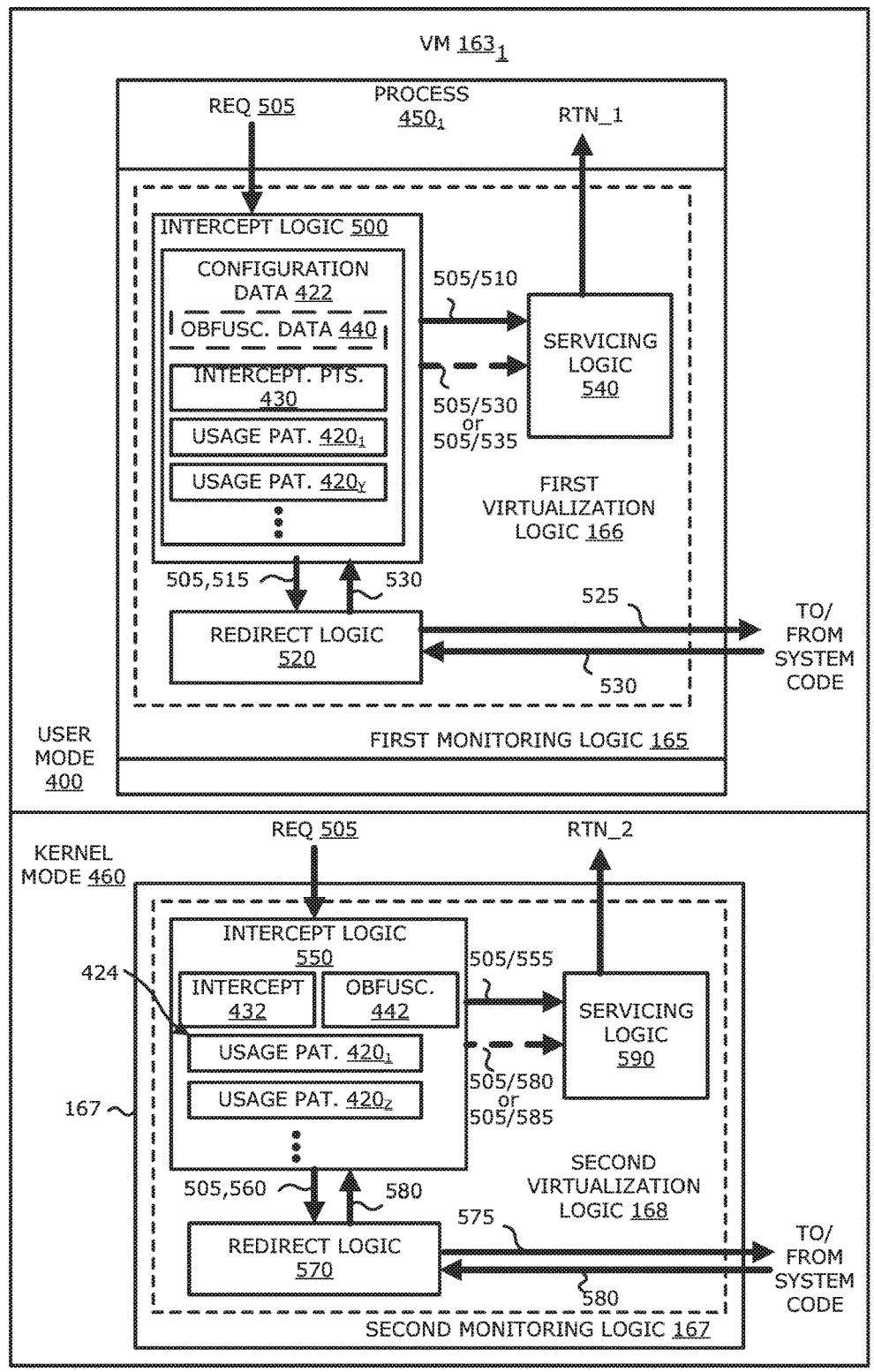
FIGS. 5A and 5B are logical representations that illustrate the functionality of the first virtualization logic and the second virtualization logic of FIG. 4A.

Referring now to FIG. 5A, the logical representation of the first virtualization logic 166 and the second virtualization logic 168 of FIG. 4A is shown. Herein, the first virtualization logic 166 features intercept logic 500, redirect logic 520 and servicing logic 540. In response to a request 505 being initiated by an active process (e.g., process $450_1$) and identified (e.g., hooked) by one of the interception points 430, the intercept logic 500 intercepts the request 505.

Thereafter, the contents of the request 505 are analyzed to determine whether a resource associated with the request 505 is to be virtualized. The virtualization is selectively based, at least in part, on a number of mutually exclusive factors as identified in FIG. 4B, such as the type of object under analysis (e.g., exe, dll, pdf, etc.) and/or platform type (Web analysis, Email address, etc.). Such analysis may involve a comparison of content within the request 505 and/or metadata associated with the object 148 of FIG. 1 to content within one or more stored usage patterns $420_1$-$420_X$ that are associated with one of the interception points 430 that identified the request 505 (referred to herein as the "identifying intercept point 430").

As an alternative, it is contemplated that, upon receipt of the request 505, the intercept logic 500 may be configured to determine the active process (or thread) that initiated the request 505 in lieu of reliance on correspondence between a particular interception point and one or more usage patterns. Thereafter, the intercept logic 500 may access some of the usage patterns $420_1$-$420_Y$ that are applicable to this process (or thread). It is noted that, for clarity sake, selective virtualization at a process-level is described, although selective virtualization at a thread-level may be conducted.

Upon detecting that the resource is to be virtualized, depending on the type of virtualization scheme to be utilized, the request 505 is provided to either the redirect logic 520 or the servicing logic 540 along with information to complete the request 505.

More specifically, as an illustrative example, upon receipt of the request 505, such as an API call that constitutes a foreground window handle query (hereinafter "Query Foreground Window Handle request") from the first process $450_1$ (and/or the particular thread of the first process $450_1$), the intercept logic 500 may determine whether any of the usage patterns $420_1$-$420_X$ are associated with the identifying intercept point 430.

In response to identifying a subset of the usage patterns $420_1$-$420_X$ (e.g., usage patterns $420_1$-$420_Y$, where $1 \leq Y \leq X$) that are associated with the identifying intercept point 430, the intercept logic 500 determines whether any of these usage patterns $420_1$-$420_Y$ correspond to a foreground window handle query and whether selected criterion within the usage patterns $420_1$-$420_Y$ (e.g., object type, or platform type, etc.) are satisfied by metadata associated with the object and/or information associated with the request 505. If so, the intercept logic 500 determines the virtualization scheme to be undertaken (e.g., intercept and service), and in response, may provide the request 505 and virtualized data 510 for servicing the request 505 via signaling (RTN_1). This virtualized data 510 may include a particular window handle (e.g., the handle for a particular browser type such as Internet Explorer®, FireFox®) and/or an address pointer or other type of identifier for the servicing logic 540 to procure the particular window handle. The particular window handle is returned by the servicing logic 540 to the portion of the first process $450_1$ that initiated the request 505 in order to complete the request 505.

Of course, prior to servicing the request 505, it is contemplated that the intercept logic 500 may conduct further modifications to the virtualized data 510 in accordance with obfuscation data 440, such as removing one or more variables or other sensitive information associated with the virtualized data 510 or substituting the virtualized data 510 with data that causes the servicing logic 540 to return an error code. Thereafter, the virtualized data 510 would be passed to the servicing logic 540 to complete the request 505.

As another illustrative example, upon intercepting the request 505, such as an API call that constitutes a process handle query (hereinafter "Query Process Handle request") from the first process $450_1$, similar to the discussion above, the intercept logic 500 may determine whether any of the usage patterns $420_1$-$420_X$ correspond to the identifying intercept point 430.

In response to identifying a subset of the usage patterns $420_1$-$420_X$ (e.g., usage patterns $420_1$-$420_Y$) that are applicable to identifying intercept point 430, the intercept logic 500 determines whether any of these usage patterns $420_1$-$420_Y$ correspond to a Query Process Handle request and whether selected criterion within usage patterns $420_1$-$420_Y$ (e.g., object type, or platform type, etc.) is satisfied by metadata associated with the object under analysis and/or information associated with the request 505. If so, according to one embodiment of the disclosure, the intercept logic 500 determines the virtualization scheme to be undertaken (e.g., intercept and redirect).

Responsive to the virtualization flag associated with that usage pattern being set to denote virtualization of input data, the intercept logic 500 provides the request 505 and the virtualized data 515 to the redirect logic 520. Examples of the virtualized data 515 may include an alternative path (C:\Program Files\Common Files\Microsoft Shared\ Backup\process_xyz.dll), which differs from the path (C:\Program Files\Common Files\Microsoft Shared\ process_ xyz.dll) normally associated with the Query Process Handle request for the first process $450_1$.

Thereafter, the redirect logic 520 modifies the request 505 and forwards a modified Query Process Handle request 525 to the system code (not shown), which accesses resources targeted by the alternative path. The process handle associated with the alternative path (hereinafter referred to as the "virtualized process handle 530") is returned to the redirect logic 520 and subsequently passed to the intercept logic 500. The intercept logic 500 provides the virtualized process handle 530 (and/or information associated with request 505) to the servicing logic 540 to complete the request 505.

It is contemplated that, prior to passing the virtualized process handle 530 to the servicing logic 540, the intercept logic 500 may conduct further modifications to the virtualized process handle 530 in accordance with obfuscation data 440, such as removing one or more variables associated with the virtualized process handle 530 so that only a subset of the returned variables are enumerated or substituting the virtualized process handle 530 with data that may cause the servicing logic 540 to return an error code. Thereafter, the modified, virtualized process handle 535 is passed to the servicing logic 540 to complete the request 505. Hence, obfuscation may be conducted after virtualization or, as described in FIG. 6 below, may be conducted concurrently or prior to virtualization.

Figure 5B:
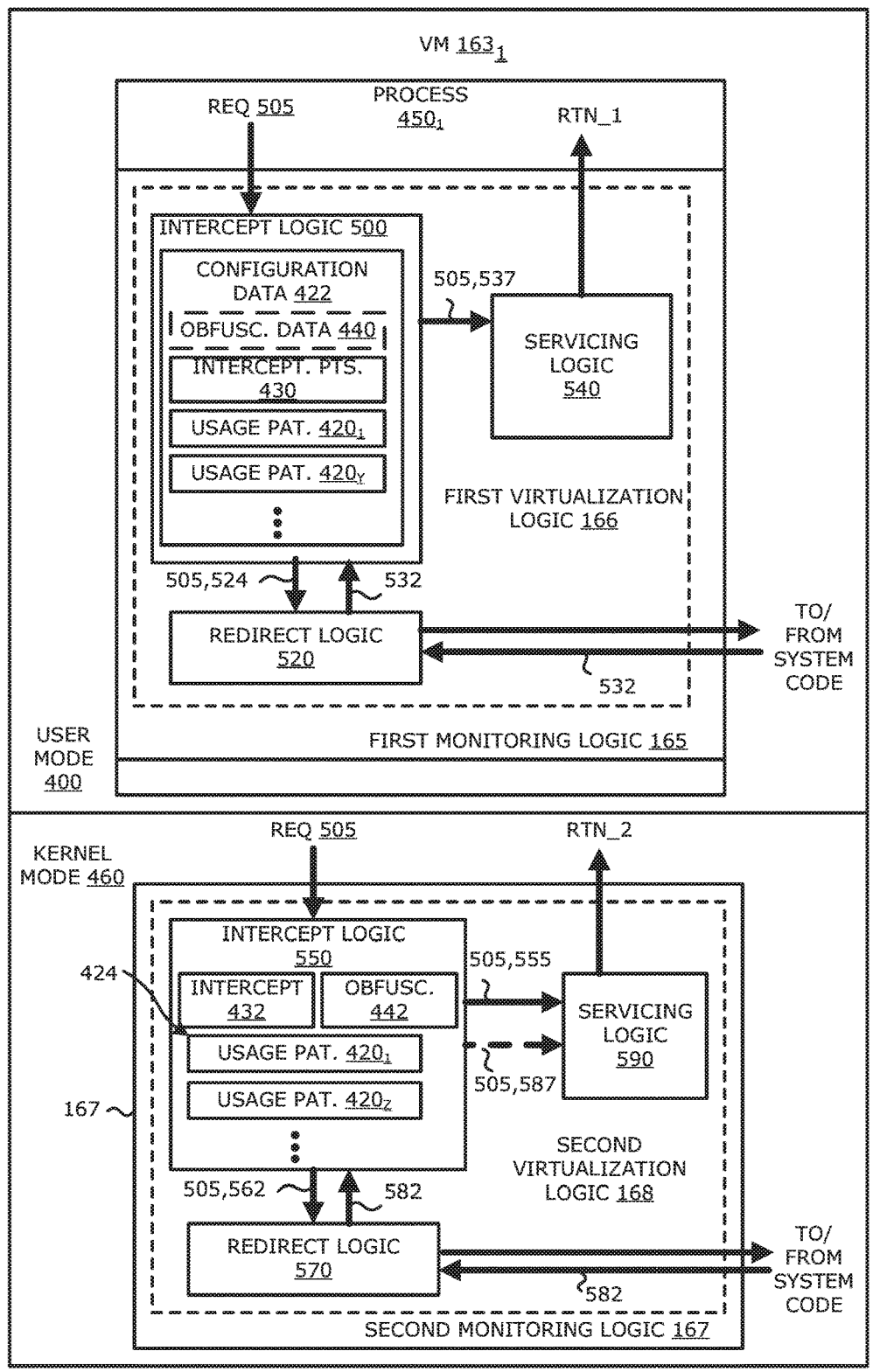

Alternatively, as shown in FIG. 5B, upon determining the virtualization scheme to be undertaken (e.g., intercept and redirect) and the virtualization flag associated with that usage pattern is set to denote virtualization of returned data (output), the intercept logic 500 provides the request 505 with a path 524, normally associated with the Query Process Handle request for the first process $450_1$, to the redirect logic 520. In response to requesting and receiving the process handle 532 from the system code (not shown), the redirect logic 520 passes the process handle 532 to the intercept logic 500, which now alters the process handle 532 and provides the modified process handle 537 (or information to procure the modified process handle 537) and/or the request 505 to the servicing logic 540. The servicing logic 540 returns the modified process handle 537 via signaling (RTN_1) to the portion of the process $450_1$ that initiated the request 505 in order to complete the request 505.

It is contemplated that the intercept logic 500 may conduct further modifications to the modified process handle 537 in accordance with obfuscation data 440 in order to add and/or remove certain information before passing the handle 537 (or perhaps data associated with an error code) to the servicing logic 540 to complete the request 505.

Referring back to FIG. 5A, the second virtualization logic 168 features intercept logic 550, redirect logic 570 and servicing logic 590, which collectively operate in a manner similar to the intercept logic 500, redirect logic 520 and servicing logic 540 of the first virtualization logic 166. However, in contrast to the intercept logic 500 operating, at least in part, as an API hook, the intercept logic 550 of the second virtualization logic 168 is configured as a driver framework that provides callbacks in response to different types of requests that originated from an active process (e.g., process $450_1$) in user mode 400. Examples of these different types of requests include, but are not limited or restricted to requests involving file management (e.g., opening file, closing file, etc.); requests involving registry key management (e.g., obtaining registry key values); requests involving network management (e.g., establish network connection, etc.); and/or any other system call.

More specifically, the second virtualization logic 168 features intercept logic 550, redirect logic 570 and servicing logic 590. As described above, the request 505 may be intercepted by the intercept logic 550 and analyzed to determine whether a resource associated with the request 505 is to be virtualized. Such analysis may involve (i) determining which of the usage patterns (e.g., usage patterns $420_1$-$420_Z$) are associated with a particular interception point that identified (e.g., hooked) the request 505 (referred to herein as the "identifying intercept point 432") and (ii) comparing content within the request 505 and/or metadata associated with the object 148 of FIG. 1 that is being analyzed to selected criterion within the usage patterns $420_1$-$420_Z$ in order to determine whether virtualization is to be conducted for the resource identified in the request 505.

Upon detecting that the resource is to be virtualized, depending on the type of virtualization scheme to be utilized, the request 505 is provided to either the redirect logic 570 or the servicing logic 590 along with virtualized data to complete the request 505.

More specifically, as an illustrative example, upon receipt of the request 505 (e.g., a Query Registry Value request) from the first process $450_1$, the intercept logic 550 may determine whether any of the usage patterns $420_1$-$420_x$ are associated with the identifying intercept point 432. In response to identifying a subset of the usage patterns $420_1$-$420_x$ (e.g., usage patterns $420_1$-$420_Z$) that are applicable to identifying intercept point 432, the intercept logic 550 determines whether any of these usage patterns $420_1$-$420_Y$ correspond to a Query Registry Value request and whether selected criterion within usage patterns $420_1$-$420_Z$ (e.g., object type, platform type, or the like in FIG. 4B) are satisfied by metadata associated with the object under analysis and/or information associated with the request 505.

If so, the intercept logic 550 determines the virtualization scheme to be undertaken (e.g., intercept and service), and in response, provides the request 505 and virtualized data 555 for servicing the request 505. This virtualized data 555 may include a particular registry key value and/or an address pointer or other type of identifier for the servicing logic 590 to procure the particular registry key value. The particular registry key value is returned by the servicing logic 590 via signaling (RTN_2) to the portion of the first process $450_1$ that initiated the request 505 in order to complete the request 505.

As another illustrative example, upon receipt of the request 505 (e.g., an Open File request) from the first process $450_1$, the intercept logic 550 may determine whether any of the usage patterns $420_1$-$420_x$ are applicable to the identifying intercept point 432. In response to identifying a subset of the usage patterns $420_1$-$420_x$ (e.g., usage patterns $420_1$-$420_Z$) that are applicable to identifying intercept point 432, the intercept logic 550 determines whether any of these usage patterns $420_1$-$420_Z$ correspond to an Open File request and whether selected criterion within usage patterns $420_1$-$420_Z$ (e.g., object type, or platform type, etc.) are satisfied by metadata associated with the object under analysis and/or information associated with the request 505.

If so, according to one embodiment of the disclosure where the virtualization flag associated with that usage pattern being set to denote virtualization of input data, the intercept logic 550 determines the virtualization scheme to be undertaken (e.g., intercept and redirect), and in response, provides the request 505 and virtualized data 560, which may include an alternative file path (C://Program Files/Backup/file.pdf) that differs from the path (C://Program Files/Current/file.pdf) normally associated with the particular requested file, to the redirect logic 570.

Thereafter, the redirect logic 570 passes a modified Open File request 575 to the system code (not shown), which accesses a file referenced by the alternative file path. The file handle associated with the alternative file path (hereinafter referred to as the "virtualized file handle 580") is returned to the redirect logic 570. The virtualized file handle 580 may be subsequently passed via the intercept logic 550 to the servicing logic 590 to complete the request 505. Of course, it is contemplated that the intercept logic 550 may conduct further modification to the virtualized file handle 580 in accordance with the obfuscation data 442, such as removing one or more variables associated with the virtualized file handle 580 or substituting the virtualized file handle 580 with data that causes the servicing logic 590 to return an error code. Thereafter, a modified, virtualized file handle 585 is returned by the servicing logic 590 to complete the request 505.

Alternatively, as shown in FIG. 5B, upon determining the virtualization scheme to be undertaken (e.g., intercept and redirect) and the virtualization flag associated with the usage pattern is set to denote virtualization of returned data (output), the intercept logic 550 provides the request 505 with a file path 562, which is normally associated with the Open File request for the requested file, to the redirect logic 570. In response to requesting and receiving a file handle 582 from the system code (not shown), the redirect logic 570 passes the file handle 582 to the intercept logic 550, which now alters the file handle 582 and provides the request 505 and/or a modified file handle 587 (or information to procure the modified file handle 587) to the servicing logic 590. The servicing logic 590 returns at least the modified file handle 587 via signaling (RTN_2) to the portion of the process $450_1$ that initiated the request 505 in order to complete the request 505.

It is contemplated that the intercept logic 550 may conduct further modifications to the modified file handle 587 in accordance with obfuscation data 442 in order to add and/or remove certain information before passing the handle 587 to the servicing logic 590 to complete the request 505.

Referring to FIG. 6, a second exemplary embodiment of the operability of logic within the user mode 400 and the kernel mode 460 of the first VM $163_1$ is shown. According to this embodiment, the configuration data 602 comprises application obfuscation data 612, interception points 622 and one or more application packages 632 (hereinafter "application package(s)").

Herein, the obfuscation data 612 includes data that is configured to obfuscate the presence of application software. Illustrative examples of manners of obfuscation that are controlled through use of the obfuscation data 612 by the first virtualization logic 166 may include, but are not limited or restricted to the following: (1) preventing display of certain information associated with a particular application software; (2) altering display of certain information associated with the particular application software so that it appears to be present in the system; and/or (3) renaming the particular application software.

As further shown in FIG. 6, the interception points 622 (e.g., hooks, breakpoints, filter drivers, etc.) are used to identify selected requests for resources that are to be virtualized. Also, each of the application package(s) 632 includes registry data, file path data, and other information that emulates the functionality for that particular virtualized application. The servicing logic (not shown) within the first virtualization logic 166 may utilize the application package(s) 632 to obtain virtualized resources in order to service incoming requests.

At the time of configuration of the first VM 1631, the first virtualization logic 166, the second virtualization logic 168, and the virtualization management logic 410 are installed. The first virtualization logic 166 and the second virtualization logic 168 are initially configured with access to configuration data 602/604, which includes application obfuscation data 612/614, interception points 622/624 that are used to identify selected requests for resources that are virtualized, and/or application package(s) 632/634 that includes virtualized software components for one or more virtualized applications.

Herein, it is contemplated that application obfuscation data, namely obfuscation data 612 which is accessible to the first virtualization logic 166, may be identical to obfuscation data 614 that is accessible to the second virtualization logic 168. Alternatively, it is contemplated that the obfuscation data 612 may differ from the obfuscation data 614, as requests handled in user mode 400 differ from requests that are handled in kernel mode 460. The interception points 622/624 and/or the application package(s) 632/634 may be identical or may differ from each other as well.

In general, obfuscation data 612/614 identifies which virtualized resources or applications are to be obfuscated. The obfuscation data 612/614 may comprise an application type identifier, a handle (or name) of the application, and a tag that, when set, identifies that the application is to be obfuscated. When an application is obfuscated, the first virtualization logic 166 and/or the second virtualization logic 168 operate to preclude normal servicing of a request, which would identify the presence of an obfuscated application (e.g., particular Query Directory request, Query Application Handle request, etc.). For instance, upon detecting a directory request that would identify the presence of an application tagged for obfuscation, even though the application is running in the first VM 1631, the first virtualization logic 166 or the second virtualization logic 168 that is servicing the request returns an error code or a displayable statement, which is normally generated when the application is actually absent from the platform.

Referring still to FIG. 6, during run time, within the user mode 400, the first VM 1631 executes one or more processes 4501-450P. As previously stated, the first process 4501 may initiate processing of the suspicious object 148 of FIG. 1, and some or all of the events detected during processing of the suspicious object 148 are monitored by the first monitoring logic 165 and reported to the event log 169.

The virtualization management logic 410 includes the configuration monitoring logic 414, which is configured to detect an update to the configuration data 602 and/or 604, where the update configuration data 620 is downloaded from management system 120, cloud services 138 and/or another TDP (e.g., TDP 1102 or 1103) of FIG. 1. These updates 620 may be directed to adding an additional interception point 626, application-specific obfuscation data 616, and/or application package 636 within the configuration data 612 and/or 614; modifying an existing interception point 622/624, application-specific obfuscation data 612/614 and/or a particular application package that is part of the application package(s) 632/634 within configuration data 602/604; and/or deleting an existing interception point 622/624, application-specific obfuscation data 612/614 and/or a particular application package that is part of the application package(s) 632/634 within configuration data 602/604.

Referring still to FIG. 6, the first virtualization logic 166 is responsible for selectively virtualizing resources requested by the first process 4501 operating within the first VM 1631 in user mode 400. The requested resources may include directory queries, application or process queries, or the like. The second virtualization logic 168 is responsible for virtualizing resources requested by the first process 4501 that are normally handled in kernel mode 460. These requested resources may include operations directed to file management (e.g., opening file, closing file, etc.) and/or registry key management (e.g., obtaining registry key values), for example. Selective virtualization is accomplished by accessing information within stored application package(s) 632 and 634.

More specifically, upon receipt of the Query Directory request 630 (e.g., a Query for retrieval of stored applications, documents and other content) from a calling routine within the process 4501, the first virtualization logic 166 determines which of the interception points 622 identified (e.g., hooked) the Query Directory request 630 (hereinafter referred to as "identifying intercept point 622").

Thereafter, the contents of the request 505 are analyzed to determine whether a resource associated with the request 630 is to be virtualized. The virtualization is selectively based, at least in part, on the presence of one of the application package(s) 632 that features the requested, virtualized resource. If so, the first virtualization logic 166 determines the virtualization scheme to be undertaken (e.g., intercept and service).

In response to determining that the virtualization scheme for the handling of a Query Directory request 630 is an "intercept and service" virtualization scheme, before servicing the request 505, the first virtualization logic 166 may access the obfuscation data 614 to identify those applications and/or resources that are selected to be hidden. Hence, the first virtualization logic 166 may return handles associated with applications, folders, documents and other items to the first process 4501, but would exclude handles associated with resources that are unique to any of the application package(s) 632 that are identified for obfuscation.

As another illustrative example, upon receipt of the request 640 (e.g., Open File request that is hooked during transmission from user mode 400 to kernel mode 460 by one of the interception points 624), the second virtualization logic 168 may determine which of the application package(s) 634 (e.g., a first application package 634) corresponds to the identifying intercept point 624 that hooked the request 640. According to one embodiment of the disclosure, before servicing the request 640 by fetching a file path from the first application package 634 to complete the Open File request 640, the second virtualization logic 168 may access the obfuscation data 614 to identify the first application package 634 or certain resources within the first application package 634 are subject to obfuscation.

In the event that the requested file is associated with the first application package 634, according to one embodiment of the disclosure, the second virtualization logic 168 generates a modified Open File request having an alternative file path (C://Program Files/error/msg1.txt). The alternative file path obfuscates the presence of the requested file which, in turn, may denote the presence of application software represented by the first application package. This obfuscation is conducted to reduce the possibility of malware evading detection by determining that the object is being processed in a sandbox environment (e.g., on the first VM 1631).

Thereafter, although not shown, the second virtualization logic 168 forwards a modified Open File request to the system code (not shown), which accesses the error message (msg1.txt) referenced by the alternative file path (C://Program Files/error/msg1.txt). The error message may be returned to the second virtualization logic 168 and subsequently serviced to complete the Open File request 640.

As yet another illustrative example, upon receipt of the request 640 (e.g., the Open File request), the second virtualization logic 168 may determine which of the application package(s) 634 (e.g., a first application package 634) correspond to the identifying intercept point 624 that hooked the request 640. In the event that the requested file is associated with the first application package 634, according to one embodiment of the disclosure, the second virtualization logic 168 determines what virtualization scheme is to be undertaken (e.g., intercept and redirect), and in response, the second virtualization logic 168 generates a modified Open File request having an alternative file path to a virtualized file that is part of the first application package 634.

Thereafter, although not shown, the second virtualization logic 168 forwards a modified Open File request to the system code (not shown), which returns information to the second virtualization logic 168 for opening the requested file. Prior to servicing the request 640, the first virtualization logic 166 may access the obfuscation data 614 to identify when applications and/or resources that are selected to be hidden. In response to detecting that the requested file is part of the obfuscated, first application package 634, the first virtualization logic 166 may return and error message (msg1.txt) to complete the Open File request 640.

It is contemplated that a hybrid selective virtualization scheme may be formulated by a combination of the operations described in FIGS. 5A-5B and 6, where a portion of the application that are present in multiple versions may be virtualized as the application package described in FIG. 6, while incompatible software components for these applications are virtualized as resources in accordance with FIGS. 5A-5B.

IV. VMM-Based Selective Virtualization

Figure 7:
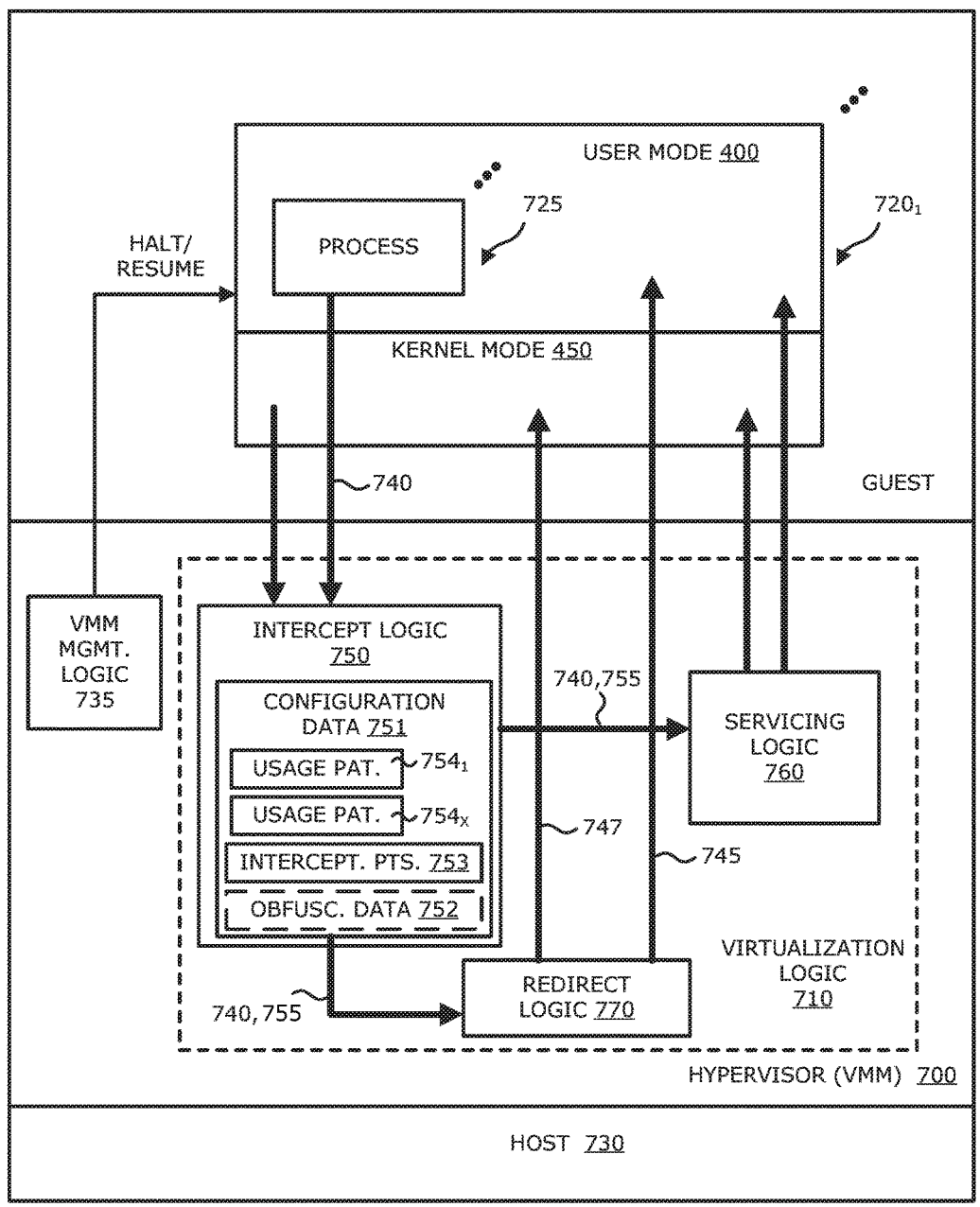
FIG. 7 is a third exemplary embodiment illustrating a logical representation of virtualization logic deployed within a hypervisor that is configured to conduct selective virtualization of one or more requested resources.

Referring now to FIG. 7, according to a second embodiment of the disclosure, instead of configuring a virtual machine to conduct virtualization within the user mode 400 and kernel mode 460 as shown in FIG. 1, virtualization logic 710 may be deployed within a hypervisor 700. Herein, the virtualization logic 710 is configured to virtualize resources by (i) intercepting and redirecting requests associated with a first subset of activities and (ii) intercepting and servicing requests associated with a second subset of activities, as described below. These requests may include a system call for a particular service such as hardware-related services (e.g., access to a storage device such as a hard disk drive), or process management (e.g., creation, termination, scheduling of a process). In a virtual analysis environment, a system call may be initiated from one or more processes 725 running in user mode 400 of a virtual machine (VM).

As shown, the hypervisor 700, also referred to as a virtual machine monitor (VMM), manages operability of one or more virtual machines (VM) $720_1$-$720_J$ (J≥1), including processing of the guest OS, and is configured to detect and control the handling of requests, including system calls. The hypervisor 700 may be a "Type 1" hypervisor that runs directly on hardware or a "Type 2" hypervisor that runs on a host operating system (Host OS). Herein, the hypervisor 700 runs on a Host 730, which may be hardware associated with the TDP $110_1$ or its Host OS.

More specifically, according to one embodiment of the disclosure, one or more processes (not shown) may be running in user mode of a first VM $720_1$. Each process may be assigned a unique process identifier (PID) at start time, or perhaps prior to or subsequent to execution by the first VM $720_1$.

In communication with the first VM $720_1$, the hypervisor 700 comprises VMM management logic 735 in communication with intercept logic 750, servicing logic 760 and redirect logic 770. In response to a request 740 (e.g., a system call) generated by process 725 during virtual processing of the suspicious object, the VMM management logic 735 temporarily halts execution the first VM $720_1$. By halting execution, an instruction pointer is maintained at the virtual memory address associated with the request 740. Thereafter, the VMM management logic 735 invokes and passes operation control to the intercept logic 750.

The intercept logic 750 determines whether the request 740 is directed to a virtualized resource by determining an association between the interception point 753 that identified (e.g., hooked) the request 740 and one or more of the usage patterns $754_1$-$754_X$. If the request 740 is directed to a virtualized resource, the intercept logic 750 determines what virtualization scheme is to be conducted in connection with the resource (e.g., Intercept & Service; Intercept & Redirect). Additionally, for selective virtualization involving intercepting and redirecting requests, the intercept logic 750 may further determine when the virtualization scheme is to be conducted (e.g., at input and/or output) through the tri-state virtualization flag described above.

For a first type of virtualization scheme (Intercept & Service), the intercept logic 750 invokes servicing logic 760, which analyzes state information associated with the first VM $720_1$ to determine a memory location for placement of data returned in response to the request 740. Thereafter, the virtualized data is inserted into the memory location, the instruction pointer is changed to reference an end of a function associated with the system call 740, and the first VM $720_1$ resumes. As a result, the first VM $720_1$ continues as if the system call 740 has been completed.

For a second type of virtualization scheme (Intercept & Request), the intercept logic 750 invokes redirect logic 770 and provides the virtualized data 755 (e.g., an alternative path, alternative handle, etc.) to the redirect logic 770. Thereafter, the redirect logic 770 modifies the system call 740, returns the modified system call 745 to the first VM $720_1$ to resume. As an optional feature, the process may be further altered by setting an interception point (e.g., breakpoint, call, etc.) at the end of the system call, which causes the hypervisor 700 to stop the process again and invoke the intercept logic 750. At this point, based on the configuration data, the redirect logic 770 may conduct further changes.

Alternatively, upon determining the virtualization scheme to be undertaken (e.g., intercept and redirect) and the virtualization flag is not set, the intercept logic 750 invokes the redirect logic 770, which inserts an interception point (e.g., breakpoint, API call, etc.) at the end of the system call 740, and causes the first VM $720_1$ to resume. Upon completion of the system call, a call is initiated that prompts the hypervisor 700 to temporarily halt execution of the first VM $720_1$ again and invoke the intercept logic 750. At this point, based on the configuration data 751, the redirect logic 770 may alter data associated with the requested resource.

More specifically, as an illustrative example, upon receipt of the request 740 (e.g., a Query Registry Value request) from a calling routine within a process, the hypervisor 700 temporarily halts operations of the first VM $720_1$ and invokes the intercept logic 750. Initially, the intercept logic 750 accesses the configuration data 751 to determine whether the request 740 is associated with a prescribed interception point 753 (e.g., a particular hook, breakpoint, or API call). If so, the intercept logic 750 further accesses some or all of the usage patterns $754_1$-$754_X$ to determine criteria for conducting virtualization of a requested resource in accordance with the usage patterns $754_1$-$754_X$, the type of request ("Query") and the particular resource associated with the request 740 (registry_key_1).

In the event that the request 740 is directed to a virtualized resource (e.g., sufficient compliance with the criteria in at least one of the usage patterns such as usage pattern $754_1$), the intercept logic 750 determines what virtualization scheme is to be conducted to the resource (e.g., Intercept & Service). The intercept logic 750 invokes and provides the request 740 and virtualized data 755 acquired from the usage pattern $754_1$ to the servicing logic 760. The servicing logic 760 analyzes state information associated with the first VM $720_1$ to determine a memory location for placement of the virtualized data to be returned for the value of registry_key_1 in response to the Query Registry Key request 740 and a targeted location for the instruction pointer upon resumption in VM processing. Thereafter, the virtualized data is inserted into the memory location, the instruction pointer is positioned at the end of the Query Registry key function and the first VM $720_1$ resumes. As a result, the first VM $720_1$ continues with the virtualized data as the returned registry value.

As another illustrative example, upon detecting the request 740 (e.g., "Open" system call to open a particular file transitioning from a calling routine within the user mode to driver logic within the kernel mode), the hypervisor 700 temporarily halts operations of the first VM $720_1$ and invokes the intercept logic 750. Initially, the intercept logic 750 accesses the configuration data 751 to determine whether the request 740 is associated with a prescribed interception point 753 (e.g., a particular system call, request between software drivers, etc.). If so, the intercept logic 750 further accesses some or all of the usage patterns $754_1$-$754_X$ to determine whether any of the usage patterns $754_1$-$754_X$ is associated with the prescribed interception point 753 and criteria set forth in the particular usage pattern, which may include object type, platform type, the type of request ("Open"), the particular resource associated with the request 740 (C:\Program Files\Test Files\xyz.pdf), and/or other criterion identified in FIG. 4B.

In the event that the request 740 is directed to a virtualized resource based on identifying an applicable usage pattern (e.g., usage pattern $754_1$) that is associated with the interception point 753, the intercept logic 750 may determine what virtualization scheme is to be conducted to the resource (e.g., Intercept & Redirect). In the event that virtualization flag is set to identify that virtualization is to be conducted to input data, the intercept logic 750 invokes the redirect logic 770 and provides the request 740 and the virtualized data 760, namely the alternative file path (C:\Program Files\Test Files\xyz.pdf) acquired from the usage pattern $754_1$, to the redirect logic 770. The redirect logic 770 modifies the Open File request 740 with the alternative file path, and returns the modified Open File request 747 to the kernel mode 460 and the first VM $720_1$ resumes. As an optional feature, an interception point (e.g., system call, etc.) may be inserted at the end of the Open File request 740, which causes the hypervisor 700 to stop the first VM $720_1$ upon completion of the Open File function and invoke the intercept logic 750. At this point, based on the configuration data 751, the redirect logic 770 may alter stored data associated with the request 740.

Alternatively, upon determining the virtualization scheme to be undertaken (e.g., intercept and redirect) and the virtualization flag is set to identify that virtualization is to be conducted to returned data, the intercept logic 750 invokes the redirect logic 770, which inserts an interception point (e.g., API call, syscall, etc.) at the end of the Open File call 740 and causes the first VM $720_1$ to resume. Upon completion of the Open File call 740, a request is initiated that prompts the hypervisor 700 to temporarily halt execution of the first VM $720_1$ and invoke the intercept logic 750. At this point, based on the configuration data, the redirect logic 770 analyzes state information associated with the first VM $720_1$ to determine a virtual memory location in which the file path for the targeted file is stored. Thereafter, the redirect logic 770 substitutes the stored file path with the alternate file path and causes the first VM $720_1$ to resume.

V. Light Hypervisor-Based Selective Virtualization

Figure 8:
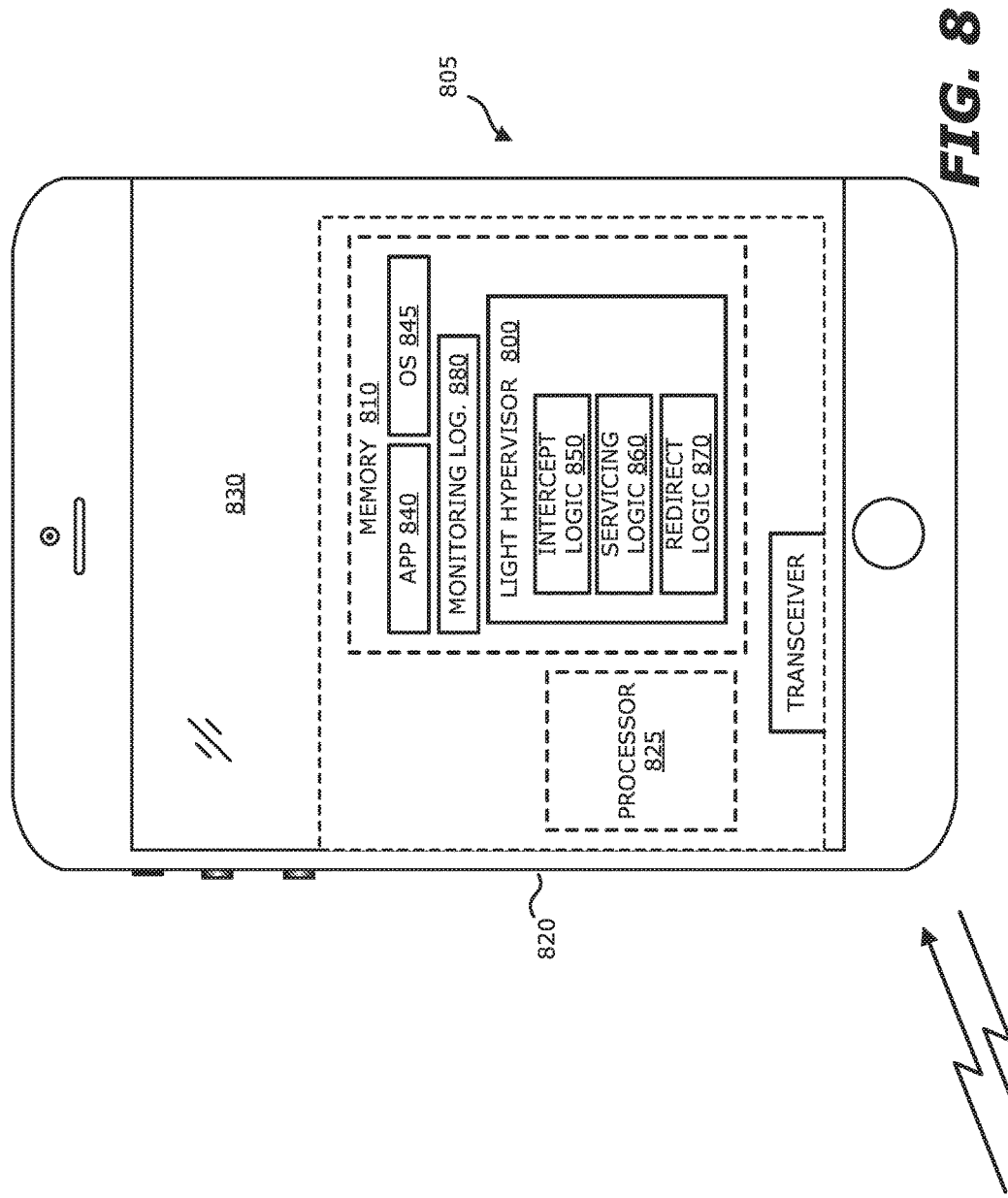
FIG. 8 is an exemplary embodiment of an illustrative platform that conducts selective virtualization of resources for malware detection.

Referring now to FIG. 8, according to a third embodiment of the disclosure, instead of VM-based virtualization (FIG. 6) and VMM-based virtualization (FIG. 7), the virtualization logic may be deployed within a light-weight, type 1 hypervisor (referred to herein as an "light hypervisor 800"). In lieu of managing operability of one or more VMs as performed by the hypervisor, the light hypervisor 800 is adapted to trap, at certain points of interest, host-based operations in the kernel mode and user mode.

While it is contemplated that the invention may be deployed in any device type (e.g., server, network appliance, network appliance), an illustrative embodiment of platform 805 in a smartphone form factor and deploying light hypervisor-based virtualization functionality is shown. Herein, the light hypervisor 800 is stored within a memory 810 encased within a housing 820 of the smartphone 805 having a display 830. Operating during normal run-time at which time an application 840 and/or an operating system (OS) 845 are being executed by processor 825, the light hypervisor 800 is configured to trap requests to the OS 845 (in kernel mode), even requests originating from application 840. Thereafter, if the requests are directed to selected resources that are virtualized, the intercept logic 850, the servicing logic 860 and the redirect logic 870 collectively operate to perform visualization of selected resources in a manner similar to the operations conducted by the hypervisor 700 of FIG. 7. The monitoring logic 880 is configured to monitor behaviors, most notably anomalous behaviors of the application 840 and the OS 845 during execution.

Figure 9:
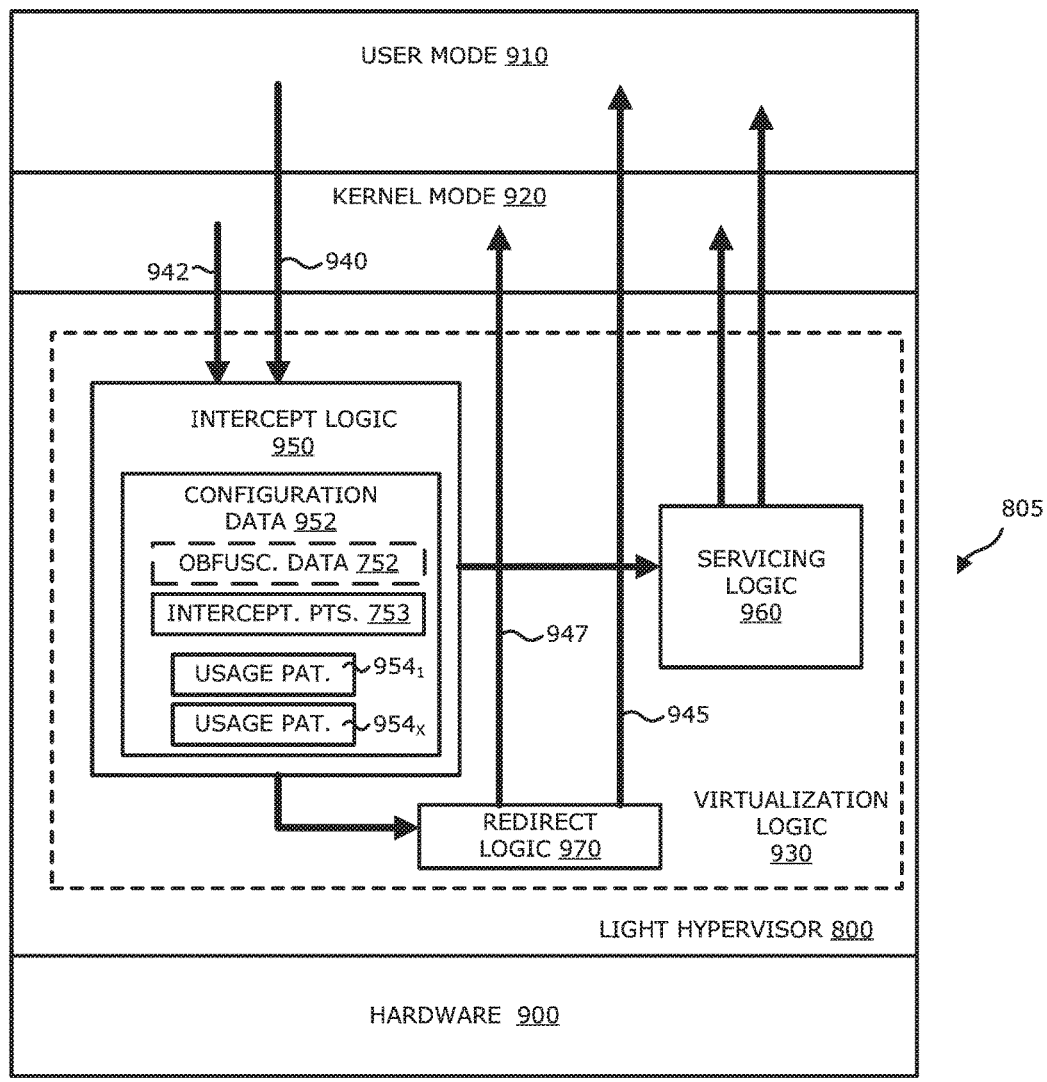
FIG. 9 is fourth exemplary embodiment illustrating a logical representation of virtualization logic deployed within a light hypervisor that is deployed within a platform and configured to conduct selective virtualization of resources for malware detection.

Referring to FIG. 9, a logical representation of the platform 805 with a light hypervisor 800 that controls selective virtualization of resources within user mode 910 and kernel mode 920 is shown. Herein, the light hypervisor 800 is communicatively coupled to hardware 900 of the platform 805 as well as software components within the user mode 910 (e.g., applications) and software components that are part of the kernel mode 920 (e.g. an operating system "OS") of the platform 805.

Herein, as an illustrative example, the light hypervisor 800 may be disposed or layered beneath the operating system kernel 920 of the platform 805 (and/or directly on native hardware 900) to thereby virtualize the hardware and control privileges (e.g., access control permissions) to hardware 900 of the platform 805 that are typically controlled by the operating system kernel. Illustratively, the hardware 900 may include (physical) processor(s), memory, network interface(s), and/or other devices. The light hypervisor 800 may be configured to control access to one or more resources of the hardware 900 in response to a request to OS functionality in the kernel mode 920.

The light hypervisor 800 may provide a virtualization layer having less functionality than a typical hypervisor. Accordingly, the light hypervisor 800 may cooperate with a hypervisor (VMM) (not shown) to provide additional virtualization functionality in an operationally and resource efficient manner.

The light hypervisor 800 comprises virtualization logic 930 that is configured to virtualize resources by intercepting requests and either (i) redirecting the intercepted requests associated with a first subset of activities or (ii) servicing the intercepted requests associated with a second subset of activities, as described below. These requests may include an API call, a system call for a particular service such as hardware-related services (e.g., access to a storage device such as a hard disk drive), file management (e.g., open, close, etc.) and network connectivity management (e.g., create network connection, terminate network connection, etc.).

More specifically, according to one embodiment of the disclosure, an application running in user mode 910 may initiate a request 940 (e.g., a system call to a software driver within the kernel mode 920), where this type of request may be monitored by the light hypervisor 800. In response to detecting the request 940, the light hypervisor temporarily halts software component functionality in the user mode 910 and kernel mode 920.

Consistent with the above-described operations of the virtualization logic 710 within the hypervisor 700, the virtualization logic 930 of the light hypervisor 800 is invoked to determine whether the request 940 is directed to a virtualized resource, and if so, determines what virtualization scheme is to be conducted to the resource (e.g., Intercept & Service; Intercept & Redirect). Additionally, for selective virtualization involving intercepting and redirecting requests, intercept logic 950 may further determine when the virtualization scheme is to be conducted (e.g., to input information or output information).

For a first type of virtualization scheme (Intercept & Service), the intercept logic 950 invokes servicing logic 960, which analyzes state information of the platform 805 to determine a memory location for placement of data returned in response to the request 940. Thereafter, the virtualized data, which is obtained from an applicable usage pattern 954₁ within the configuration data 952, may be inserted into the memory location, the instruction pointer is positioned at the end of the function associated with the request 940, and the application within the user mode resumes.

For a second type of virtualization scheme (Intercept & Request), the intercept logic 950 invokes redirect logic 970 and provides the virtualized data (e.g., an alternative path, alternative handle, etc.) to the redirect logic 970. Thereafter, the redirect logic 970 modifies content of the request 940, returns the modified request 945 to the user mode. The same operations apply to requests 942, which are detected in transition from user mode to kernel mode or detected during inter-communication between software drivers and modified by the redirect logic 970 and returned as modified requests 947 to the kernel mode 920.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method comprising:
configuring a virtual machine running within a platform with a first virtualization logic;
monitoring, by the first virtualization logic, for a first plurality of requests that are initiated during processing of an object within the virtual machine, each of the first plurality of requests is associated with an activity to be performed in connection with one or more resources; and
selectively virtualizing, by the first virtualization logic, resources associated with a second plurality of requests that are initiated during the processing of the object within the virtual machine, wherein the second plurality of requests being lesser in number than the first plurality of requests and the selectively virtualizing of the resources comprises
intercepting a first request of the second plurality of requests,
redirecting the first request of the second plurality of requests, the redirecting of the first request comprises generating a modified first request by changing a resource associated with the first request and subsequently passing the modified first request to system code for processing, and
receiving virtualized data in response to passing the modified first request to the system code.

2. The computerized method of claim 1, wherein the configuring of the virtual machine further comprises providing the first virtualization logic with access to configuration data, the configuration data comprises one or more interception points that are used for intercepting at least the first request of the second plurality of requests.

3. The computerized method of claim 2, wherein the one or more interception points comprise an Application Programming Interface (API) hook.

4. The computerized method of claim 2, wherein the configuration data further comprises at least one usage pattern that specifies a particular resource for virtualization and activities for conducting the virtualization, the particular resource corresponding to the first request that is part of the second plurality of requests.

5. The computerized method of claim 1, wherein the selectively virtualizing of the resources associated with at least the first request of the second plurality of requests further comprises
servicing, by the first virtualization logic, a virtualized resource associated with a second request of the first plurality of requests by returning virtualized data to a process or a thread operating within the virtual machine that initiated the second request.

6. The computerized method of claim 5, wherein the virtualized data associated with the second request comprises a handle.

7. The computerized method of claim 5, wherein the resource associated with the first request is accessible via a path to a first address in a virtual memory of the platform and a resource associated with the modified first request comprises an alternative path to a second address in the virtual memory of the platform, the second address in the virtual memory being different from the first address in the virtual memory.

8. The computerized method of claim 1, wherein the second plurality of requests is a subset of the first plurality of requests.

9. The computerized method of claim 8, wherein the first virtualization logic is implemented in a user mode of the virtual machine.

10. The computerized method of claim 8 further comprising:
obfuscating, by the first virtualization logic, the virtualized resources associated with the first request of the second plurality of requests by removing a portion of the virtualized data prior to returning the virtualized data to a process or a thread operating within the virtual machine that initiated the first request.

11. The computerized method of claim 9 further comprising:
configuring the virtual machine running within the platform with a second virtualization logic that is implemented within a kernel mode of the virtual machine; and
selectively virtualizing, by the second virtualization logic, resources associated with a third plurality of requests that are initiated during the processing of the object within the virtual machine, where the third plurality of requests being lesser in number than the first plurality of requests and different from the second plurality of requests.

12. The computerized method of claim 11, wherein the second virtualization logic is responsible for selectively conducting virtualization to the resources associated with the third plurality of requests that are handled in the kernel mode of the virtual machine, the third plurality of requests being a subset of the first plurality of requests.

13. The computerized method of claim 12, wherein at least one request of the third plurality of requests includes either (i) a request directed to file management, including opening a file or closing a file, or (ii) a request directed to registry key management, including obtaining a registry key value.

14. The computerized method of claim 12, wherein the third plurality of requests includes one or more requests directed to network management, including establishing a network connection.

15. The computerized method of claim 1, wherein the virtualizing of the resources associated with the second plurality of requests includes transparently modifying access to at least one or more of the resources by one or one processes operating within the virtual machine.

16. The computerized method of claim 1, wherein the selectively virtualizing of the resources associated with at least the first request of the second plurality of requests further comprises
obfuscating at least a portion of the virtualized data prior to returning the virtualized data to a process or thread operating within the virtual machine that initiated the first request.

17. The computerized method of claim 16, wherein the obfuscating includes performance of at least one of (i) preventing a display of certain information directed to a resource of the one or more resources, (ii) altering certain information associated with the resource so that it appears to be present in a platform represented by the virtual machine, or (iii) renaming the resource.

18. The computerized method of claim 1, wherein the selectively virtualizing of the resources associated with the second plurality of requests being a subset of the first plurality of requests further comprises
redirecting a second request of the second plurality of requests by subsequently passing the second request to the system code for processing;
receiving data in response to passing the second request to the system code; and
servicing, by the first virtualization logic, a virtualized resource associated with the second request of the second plurality of requests by returning virtualized data in lieu of the received data to a process or a thread operating within the virtual machine that initiated the second request.

19. A computerized method for configuring a virtual machine to selectively conduct virtualization of one or more resources during analysis of an object for malware, the computerized method comprising:
configuring the virtual machine running within a platform with a first virtualization logic that is configured with access to a first configuration data, the first configuration data comprises (i) information that is used by the first virtualization logic to identify and subsequently intercept at least a first request that, when processed, performs an activity on a first resource, and (ii) one or more usage patterns including information to determine whether to perform virtualization of the first resource associated with the first request and information associated with one or more activities that are to be performed in connection with the first resource during the virtualization operation;
responsive to detecting an update to the first configuration data, modifying the first configuration data to alter at least one of (i) the information that is used by the first virtualization logic to identify and subsequently intercept at least the first request, (ii) one or more usage patterns including the information to determine whether to perform the virtualization of the first resource, and the information associated with the one or more activities that are to be performed in connection with the first resource associated with the first request during the virtualization operation, or (iii) obfuscation data used by the first virtualization logic to obfuscate the presence of the first resource or an entire set of resources;
providing a second virtualization logic configured with access to a second configuration data, the second configuration data comprises (i) information that is used by the second virtualization logic to identify and subsequently intercept at least a second request that, when processed, performs an activity on a second resource, and (ii) the one or more usage patterns including information to determine whether to perform virtualization of the second resource associated with the second request and information associated with one or more activities that are to be performed in connection with the second resource during the virtualization operation; and
responsive to detecting an update to the second configuration data, modifying the second configuration data to alter at least one of (i) the information that is used by the second virtualization logic to identify and subsequently intercept at least the second request, (ii) one or more usage patterns including the information to determine whether to perform the virtualization operation, and the information associated with one or more activities that are to be performed in connection with the second resource, or (iii) obfuscation data used by the second virtualization logic to obfuscate the presence of the second resource or an entire set of resources.

20. The computerized method of claim 19, wherein the first virtualization logic is deployed within a user mode of the virtual machine.

21. The computerized method of claim 20, wherein the second virtualization logic is deployed within a kernel mode of the virtual machine.

22. The computerized method of claim 21, wherein the information associated with the one or more activities that are performed in connection with the second resource includes altering a file path.

23. The computerized method of claim 22, wherein the information associated with the one or more activities that are performed in connection with the first resource includes altering a handle for the first resource.

24. A non-transitory computer readable medium that stores virtualization logic operating within a virtual machine that, when executed by one or more processors, performs operations comprising:
receiving, by the virtualization logic, a request from a process running on the virtual machine, the request is associated with a first resource;
analyzing, by the virtualization logic, contents of the request to determine whether the first resource identified in the request is to be virtualized; and
in response to determining by the virtualization logic that the first resource is to be virtualized, selecting one of a plurality of virtualization schemes conducted to the first resource, the plurality of virtualization schemes comprises (1) servicing the request by returning virtualized data to a portion of the process that initiated the request where the request is one of a first subset of a plurality of requests and (2) redirecting the request to a second resource that is different from the first resource, wherein the redirecting of the request is (i) for a first type of request being one of a second subset of the plurality of request that is associated with a particular activity that is independent of kernel involvement and (ii) directed to system code.

25. The non-transitory computer readable medium of claim 24, wherein the virtualized data associated with the request being one of the first subset of the plurality of requests comprises a handle.

26. The non-transitory computer readable medium of claim 24, wherein the request being one of the second subset of the plurality of requests comprises a path to a first address in a virtual memory of the platform and the modified request comprises an alternative path to a second address in the virtual memory of the platform, the second address in the virtual memory being different from the first address in the virtual memory.

27. The non-transitory computer readable medium of claim 24, wherein the virtualization logic is implemented in a user mode of the virtual machine.

28. The non-transitory computer readable medium of claim 24, wherein the virtualization logic is implemented in a kernel mode of the virtual machine.

29. The non-transitory computer readable medium of claim 24, wherein the second resource corresponds to the system code.

30. The non-transitory computer readable medium of claim 24, wherein the redirecting of the request to the second resource comprises obfuscating at least a portion of the virtualized data prior to returning the virtualized data to the portion of the process that initiated the request.

31. A platform comprising:
one or more hardware processors; and
a memory coupled to the one or more processors, the memory comprises one or more virtual machines that are configured to process an object under analysis, a first virtual machine of the one or more virtual machines comprises
a first virtualization logic operating in a user mode, the first virtualization logic being configured to intercept a first request associated with a first subset of a plurality of activities that are handled by the first virtual machine, perform virtualization of a resource associated with the first request that produces virtualized data and return at least a portion of the virtualized data to a source that initiated the first request, and
a second virtualization logic operating in a kernel mode, the second virtualization logic being configured to intercept a second request associated with a second subset of the plurality of activities that are handled by the first virtual machine and different from the first subset of the plurality of activities, perform virtualization of a resource associated with the second request that produces virtualized data, and return at least a portion of the virtualized data associated with the second request to a source that initiated the second request.

32. The platform of claim 31, wherein the second virtualization logic, in response to detecting the second request associated with the second plurality of activities that are handled by the first virtual machine in kernel mode, the second virtualization logic determines whether to conduct virtualization of the resource associated with the second request.

33. The platform of claim 31 further comprising a first logic that, when executed by the one or more hardware processors, detects whether an update to the configuration data is available to the platform.

34. The non-transitory computer readable medium of claim 24, wherein the redirecting of the request to the second resource comprises
generating a modified request by changing a resource associated with the request to the second resource;
receiving virtualized data in response to providing the modified request to the second resource for processing; and
returning the virtualized data to the portion of the process that initiated the request.

35. The platform of claim 31, wherein the first virtualization logic is configured to perform virtualization of the resource associated with the first request that produces virtualized data and return at least the portion of the virtualized data to the source that initiated the first request by obfuscating at least a portion of the virtualized data prior to returning the virtualized data to the source.

36. The platform of claim 31, wherein the first virtualization logic is configured to intercept the first request associated with the first subset of the plurality of activities that are handled by the first virtual machine and service the first request by returning virtualized data to a portion of a process or threat that initiated an activity associated with the first request.

37. The platform of claim 36, wherein the first virtualization logic is configured to intercept a second request associated with the first subset of the plurality of activities that are handled by the first virtual machine, perform virtualization of a resource associated with the second request that produces virtualized data, and return at least a portion of the virtualized data to a source that initiated the second request by at least (i) generating a modified second request from the second request by changing the resource associated with the second request and subsequently passing the modified second request to system code for processing, (ii) receiving the virtualized data in response to providing the modified second request to the system code, and (iii) returning at least the portion of the virtualized data to the source.

38. The platform of claim 31, wherein the first virtualization logic is configured to intercept the first request associated with the first subset of the plurality of activities that are handled by the first virtual machine, perform virtualization of a resource associated with the first request that produces virtualized data, and return at least a portion of the virtualized data to a source that initiated the first request by at least (i) generating a modified first request from the first request by changing the resource associated with the first request and subsequently passing the modified first request to system code for processing, (ii) receiving the virtualized data in response to providing the modified first request to the system code, and (iii) returning at least the portion of the virtualized data to the source.

39. The computerized method of claim 1, wherein the system code is logic within the virtual machine that is configured to access the resources.

40. The computerized method of claim 39, wherein the logic corresponds to a portion of an operating system of the virtual machine configured to access the resources.

41. The computerized method of claim 1, wherein the second plurality of requests are initiated during the processing of the object within the virtual machine to obfuscate a presence of a particular process or processes.

42. The non-transitory computer readable medium of claim 24, wherein the system code is logic within the virtual machine that is configured to access at least the second resource.

43. The non-transitory computer readable medium of claim 42, wherein the logic corresponds to a portion of an operating system of the virtual machine configured to access at least the second resource.

44. The non-transitory computer readable medium of claim 24, wherein the particular activity is independent of kernel involvement when the particular activity is handled by the virtualization logic of the virtual machine operating in a user mode with less privileged access resources than the kernel of the virtual machine.

45. The platform of claim 31, wherein the first subset of the plurality of activities being lesser in number than the plurality of activities and the second subset of the plurality of activities being lesser in number than the plurality of activities.

46. The platform of claim 45, wherein the first virtualization logic operating in the user mode being an operating mode with lesser privileges than the kernel mode.

47. The platform of claim 37, wherein the system code is logic within the first virtual machine that is configured to access at least the resource based on the modified second request.

48. The platform of claim 47, wherein the logic corresponds to a portion of an operating system of the first virtual machine configured to access at least the resource.

* * * * *